United States Patent
Nakayama et al.

(10) Patent No.: US 9,258,445 B2
(45) Date of Patent: Feb. 9, 2016

(54) IMAGE FORMING APPARATUS, IMAGE FORMING SYSTEM AND DISPLAY CONTROL METHOD FOR DISPLAYING CONTENT BASED ON A REQUIRED AMOUNT OF TIME FOR PRINTING

(71) Applicants: Akihiro Nakayama, Kanagawa (JP); Kazuhiro Yamada, Kanagawa (JP); Takahiro Uchiki, Kanagawa (JP)

(72) Inventors: Akihiro Nakayama, Kanagawa (JP); Kazuhiro Yamada, Kanagawa (JP); Takahiro Uchiki, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 14/105,720

(22) Filed: Dec. 13, 2013

(65) Prior Publication Data
US 2014/0198341 A1  Jul. 17, 2014

(30) Foreign Application Priority Data

Jan. 17, 2013 (JP) ................................ 2013-006260

(51) Int. Cl.
*H04N 1/00* (2006.01)
*H04N 1/32* (2006.01)
*G06F 3/12* (2006.01)

(52) U.S. Cl.
CPC .......... *H04N 1/00477* (2013.01); *G06F 3/1222* (2013.01); *G06F 3/1238* (2013.01); *G06F 3/1271* (2013.01); *G06F 3/1285* (2013.01); *H04N 1/00068* (2013.01); *H04N 1/00233* (2013.01); *H04N 1/00408* (2013.01); *H04N 1/32122* (2013.01); *H04N 2201/0094* (2013.01); *H04N 2201/3205* (2013.01); *H04N 2201/3215* (2013.01); *H04N 2201/3221* (2013.01); *H04N 2201/3273* (2013.01)

(58) Field of Classification Search
CPC ... G06F 3/1204; G06F 3/1207; G06F 3/1256; H04N 2201/3215; H04N 1/00477
USPC .................................. 358/1.15, 1.13; 399/81
See application file for complete search history.

(56) References Cited

U.S. PATENT DOCUMENTS

| 7,529,549 B2 | 5/2009 | Yamada et al. |
| 7,869,082 B2 | 1/2011 | Hayashida et al. |
| 2004/0169730 A1* | 9/2004 | Tamura et al. ............. 348/207.2 |
| 2012/0062919 A1* | 3/2012 | Hashimoto .................. 358/1.12 |

(Continued)

FOREIGN PATENT DOCUMENTS

| JP | 2003-280561 | 10/2003 |
| JP | 2011-028437 | 2/2011 |

(Continued)

OTHER PUBLICATIONS

U.S. Appl. No. 13/936,377, filed Jul. 8, 2013.
U.S. Appl. No. 13/936,390, filed Jul. 8, 2013.

*Primary Examiner* — Jacky X Zheng
(74) *Attorney, Agent, or Firm* — Harness, Dickey & Pierce, PLC

(57) ABSTRACT

An image forming apparatus, which executes printing according to a print request based on an instruction by a user of a client terminal, includes a print time calculation unit that calculates a required time for printing according to the print request; and a display unit that displays a plurality of contents on a display device during an execution of printing in accordance with a content list including the plurality of contents for the user, the content list being generated based on the calculated required time for printing.

9 Claims, 15 Drawing Sheets

(56) References Cited

U.S. PATENT DOCUMENTS

2012/0311189 A1    12/2012    Yamada
2013/0027726 A1    1/2013    Yamada

FOREIGN PATENT DOCUMENTS

JP    2011028437 A *    2/2011
JP    2012-185417    9/2012

* cited by examiner

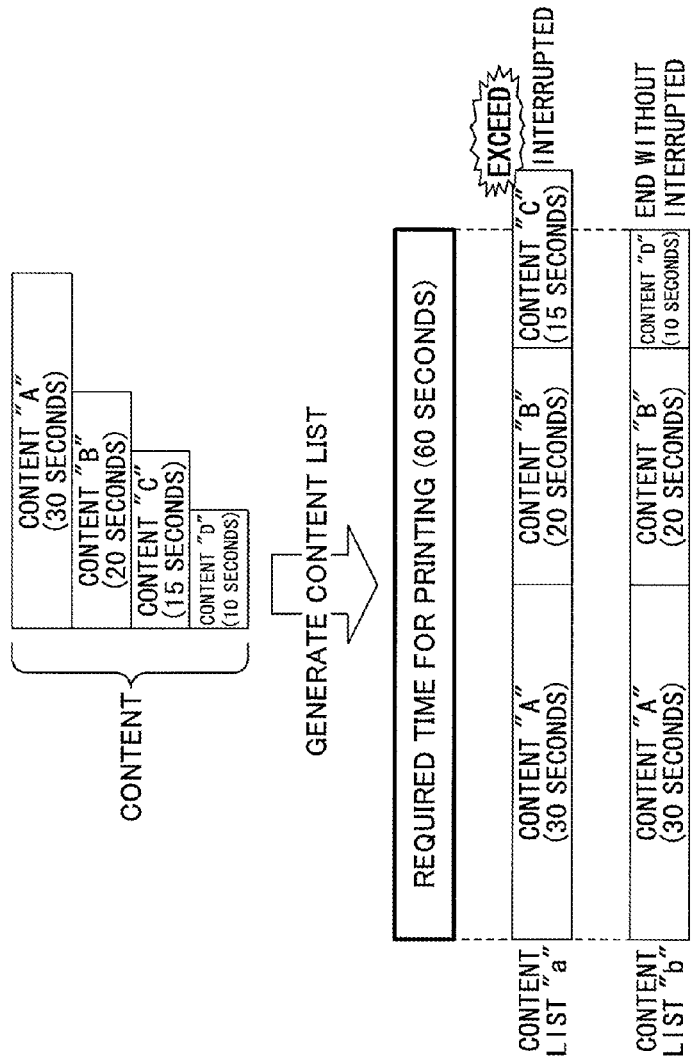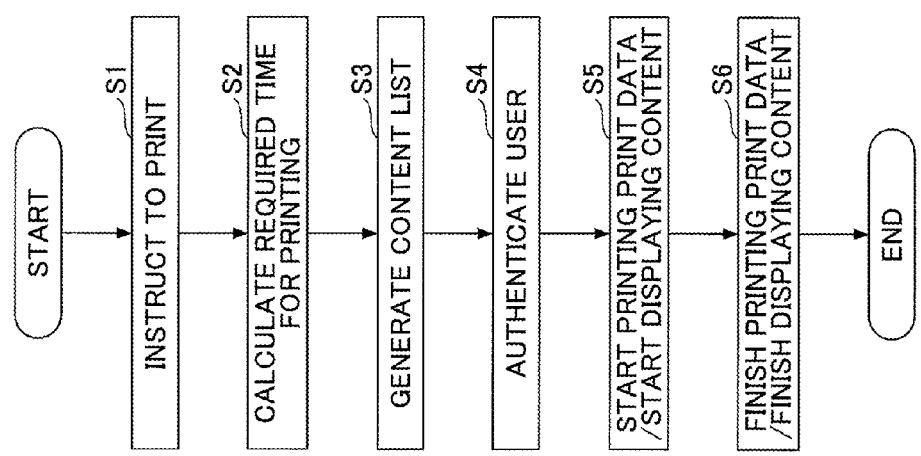

FIG.8

| ID | PAPER SIZE | PRINT TIME FOR FIRST PAGE t1 (SECONDS PER PAGE) | PRINT TIME FOR SECOND PAGE OR MORE t2 (SECONDS PER PAGE) | COEFFICIENT FOR DOUBLE-SIDED PRINTING d | ADDITIONAL TIME FOR STAPLING PROCESS s (SECONDS) | TRANSITION TIME TO NEXT PRINT JOB m (SECONDS) |
|---|---|---|---|---|---|---|
| 1 | A4 | 15.0 | 2.0 | 1.2 | 4.0 | 5.0 |
| 2 | A3 | ... | ... | ... | ... | ... |
| 3 | B5 | ... | ... | ... | ... | ... |
| 4 | B4 | ... | ... | ... | ... | ... |
| ... | ... | ... | ... | ... | ... | ... |

| LIST ID | USER IDENTIFICATION INFORMATION | CONTENT ID | NAME OF CONTENT | SOURCE OF CONTENT | DISPLAY TIME | DISPLAY ORDER | |
|---|---|---|---|---|---|---|---|
| 1 | ID USER "A" | 0001 | SALES INFORMATION | SHOP "A" | 30 SECONDS | 1 | ... |
| 1 | ID USER "A" | 0010 | COMPLEX MACHINE MP75xx RELEASE | COMPANY "R" | 20 SECONDS | 2 | ... |
| 1 | ID USER "A" | 0101 | ANNOUNCEMENT FROM PERSONNEL DEPARTMENT | PERSONNEL DEPARTMENT IN COMPANY | 10 SECONDS | 3 | ... |
| 2 | ID USER "B" | 0002 | NEW CAR RELEASE | COMPANY "X" | 25 SECONDS | 2 | ... |
| 2 | ID USER "B" | 0102 | ANNOUNCEMENT FROM ADMINISTRATION DEPARTMENT | ADMINISTRATION DEPARTMENT IN COMPANY | 10 SECONDS | 1 | ... |
| ... | ... | ... | ... | ... | ... | ... | ... |

CONTENT LIST FOR USER "A": rows with LIST ID 1
CONTENT LIST FOR USER "B": rows with LIST ID 2

| MANAGING ID | USER IDENTIFICATION INFORMATION | USER NAME | ADVERTISING CONTENT DISPLAY PERMISSION /REJECTION FLAG | GENDER | DATE OF BIRTH | AGE | RESIDENTIAL AREA | ... |
|---|---|---|---|---|---|---|---|---|
| 1 | ID USER "A" | USER "A" | YES | FEMALE | 1988/9/15 | 24 | TOKYO | ... |
| 2 | ID USER "B" | USER "B" | YES | MALE | 1983/4/3 | 29 | KANAGAWA PREF. | ... |
| 3 | ID USER "C" | USER "C" | YES | MALE | 1975/11/21 | 37 | CHIBA PREF. | ... |
| 4 | ID USER "D" | USER "D" | NO | FEMALE | 1967/10/7 | 45 | SAITAMA PREF. | ... |
| 5 | ID USER "E" | USER "E" | YES | MALE | 1954/6/1 | 58 | KANAGAWA PREF. | ... |
| ... | ... | ... | ... | ... | ... | ... | ... | ... |

FIG.13

| CONTENT ID | NAME OF CONTENT | SOURCE OF CONTENT | DISPLAY TIME | GENDER OF OBJECT | MINIMUM AGE LIMIT OF OBJECT | UPPER AGE LIMIT OF OBJECT | RESIDENTIAL AREA OF OBJECT | PRIORITY INDICATION FLAG | CLASS OF CONTENT | IDENTIFICATION INFORMATION OF DISPLAYED USER |
|---|---|---|---|---|---|---|---|---|---|---|
| 0001 | SALES INFORMATION | SHOP "A" | 30 SECONDS | n/a | 20 | 40 | KANAGAWA PREFECTURE | n/a | ADVERTISEMENT | ID USER "B" |
| 0002 | NEW CAR RELEASE | COMPANY "X" | 25 SECONDS | MALE | 25 | 60 | n/a | n/a | ADVERTISEMENT | ID USER "A" |
| 0003 | ANNOUNCEMENT OF NEW HOME | COMPANY "Y" | 40 SECONDS | n/a | 30 | 50 | KANAGAWA PREFECTURE | n/a | ADVERTISEMENT | n/a |
| ... | ... | ... | ... | ... | ... | ... | ... | ... | ... | ... |
| 0010 | COMPLEX MACHINE MP75xx RELEASE | COMPANY "R" | 20 SECONDS | n/a | 20 | 60 | n/a | n/a | ADVERTISEMENT | ID USER "C" |
| ... | ... | ... | ... | ... | ... | ... | ... | ... | ... | ... |
| 0101 | ANNOUNCEMENT FROM PERSONNEL DEPARTMENT | PERSONNEL DEPARTMENT IN COMPANY | 10 SECONDS | n/a | n/a | n/a | n/a | PRIORITY | ADMINISTRATIVE ANNOUNCEMENT | n/a |
| 0101 | ANNOUNCEMENT FROM ADMINISTRATION DEPARTMENT | ADMINISTRATION DEPARTMENT IN COMPANY | 10 SECONDS | n/a | n/a | n/a | n/a | n/a | ADMINISTRATIVE ANNOUNCEMENT | n/a |
| 0102 | CALL ATTENTION | ADMINISTRATION DEPARTMENT IN COMPANY | 1 SECOND | n/a | n/a | n/a | n/a | n/a | ADMINISTRATIVE ANNOUNCEMENT | n/a |
| ... | ... | ... | ... | ... | ... | ... | ... | ... | ... | ... |

IMAGE FORMING APPARATUS, IMAGE FORMING SYSTEM AND DISPLAY CONTROL METHOD FOR DISPLAYING CONTENT BASED ON A REQUIRED AMOUNT OF TIME FOR PRINTING

BACKGROUND OF THE INVENTION

1. Field of the Invention

The disclosures herein generally relate to an image forming apparatus, an image forming system and a display control method.

2. Description of the Related Art

Recently, an information providing service for business purposes utilizing digital displays has become popular, owing to the recent price reduction of large-sized display devices, such as liquid crystal displays, and the recent improvement of network infrastructures, which deliver contents to a display device. The information providing service for a business purpose is, for example, a service to set up a display device at a place where a wait time occurs, such as at a front desk, an elevator, in a rest stop, or the like, and to deliver an advertisement or the like to the display device, to display the content during a spare time.

However, the above-described information providing service originally aims at providing information to unspecified users, but does not provide detailed content corresponding to the needs or the preference of each individual. Moreover, a wait time varies for each individual. In a case where a user has to leave before a delivered content (e.g. a video) finishes, the user cannot watch the content to the end. Accordingly, the information providing service in the related art has a problem whereas a content provider cannot obtain the intended effect for the advertisement, the viewer may not watch the content until the end, or the viewer may have to watch uninteresting content.

On the other hand, from a viewpoint of information security, in operating an image forming apparatus, such as a printer or a multifunction peripheral (MFP), a user authentication function by IC card authentication or biometric authentication, such as fingerprint authentication, vein authentication, iris authentication, or the like, is becoming utilized more and more. By conducting the user authentication, loss of information, such as illegally viewing information written on printed matter by a third party, or stealing the printed matter, is prevented, and thus the user authentication contributes to the enhancement of the information security. Restricting the operation of the image forming apparatus by user authentication is, for example, after the user issues an instruction for printing from a personal computer (PC), the user moves to the image forming apparatus, and conducts user authentication to execute the printing. In the above example, wasted time occurs from the beginning of user authentication to the end of printing, when the user merely waits for the printing to finish.

Japanese Published Patent Application No. 2011-028437 discloses an image forming apparatus which displays data related to at least one of user information and image data to be printed on a display unit of the image forming apparatus during printing of the image data to be printed, in order to utilize the user's wait time effectively.

However, although the image forming apparatus described in the Japanese Published Patent Application No. 2011-028437, utilizes the user's wait time until the end of printing, a length of the display time of the display data (content) to be provided to the user is not taken into account. Accordingly, the provided content does not always correspond to both the content provider's needs and the user's needs, and thus the above problem is not solved. Furthermore, if the data to be displayed is related to the image data to be printed, which includes highly-confidential information, such as "for internal use only", or the like, a third party may view the confidential information, and thus the image forming apparatus disclosed in the Japanese Published Patent Application 2011-028437 also poses a problem of information security.

SUMMARY OF THE INVENTION

It is a general object of at least one embodiment of the present invention to provide an image forming apparatus, image forming system and a display control unit that substantially obviates one or more problems caused by the limitations and disadvantages of the related art.

In one embodiment of the present invention, an image forming apparatus, which executes printing according to a print request based on an instruction by a user of a client terminal, is provided. The image forming apparatus includes: a print time calculation unit that calculates a required time for printing according to the print request; and a display unit that displays a plurality of contents on a display device during an execution of the printing in accordance with a content list including the plurality of contents for the user, the content list being generated based on the calculated required time for printing.

In another embodiment of the present invention, an image forming system includes: an image forming apparatus, which executes printing according to a print request based on an instruction by a user of a client terminal; a display device, on which a plurality of contents for the user are displayed; and a content management server that manages the plurality of contents. The image forming apparatus includes: a print time calculation unit that calculates a required time for printing according to the print request; a content list acquisition unit that transmits a content list acquisition request, including the required time for printing, to the content management server, in order to acquire a content list including the plurality of contents, which are displayed on the display device; and a display unit that displays the plurality of contents on the display device during an execution of printing in accordance with the content list. The content management server includes a content list generation unit that generates the content list based on the required time for printing included in the content list acquisition request.

In yet another embodiment of the present invention, a display control method for displaying on a display device a plurality of contents for a user of a client terminal during an execution of printing at an image forming apparatus according to a print request based on an instruction by the user is provided. The method includes: calculating a required time for printing according to the print request; generating a content list including the plurality of contents, which are displayed on the display device based on the calculated required time for printing; and displaying, in accordance with the content list, the plurality of contents on the display device during the execution of printing.

According to the exemplary embodiment, during printing in the image forming apparatus, the wait time for printing is effectively utilized.

BRIEF DESCRIPTION OF THE DRAWINGS

Other objects and further features of embodiments will be apparent from the following detailed description when read in conjunction with the accompanying drawings.

FIG. 2A is a flowchart illustrating an example of a process of the image forming system according to the exemplary embodiment;

FIG. 2B is a diagram illustrating the example of the process of the image forming system according to the exemplary embodiment;

FIG. 8 is a table illustrating an example of information stored in a process time storage unit of the MFP according to the exemplary embodiment;

FIG. 10 is a table illustrating an example of information stored in a content list storage unit of the MFP according to the exemplary embodiment;

FIG. 12 is a table illustrating an example of information stored in a user information storage unit of the content management server according to the exemplary embodiment;

FIG. 13 is a table illustrating an example of information stored in a content information storage unit of the content management server according to the exemplary embodiment;

DESCRIPTION OF THE PREFERRED EMBODIMENTS

In the following, embodiments of the present invention will be described with reference to the accompanying drawings.

[System Configuration]

Figure 1A:
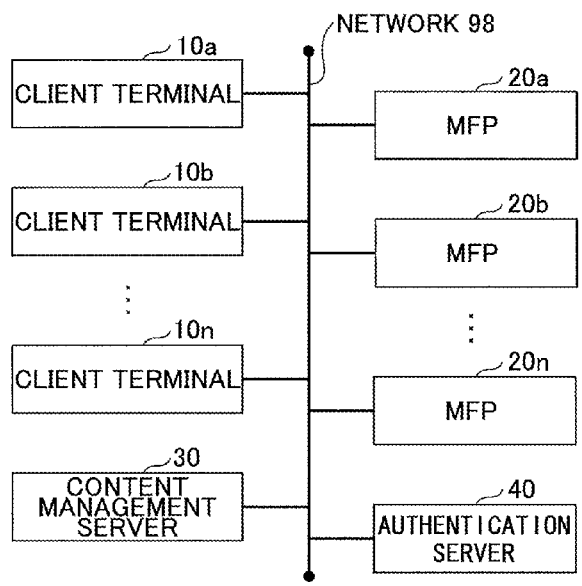
FIGS. 1A and 1B are diagrams illustrating examples of configurations of an image forming system according to the exemplary embodiment.
Figure 1B:
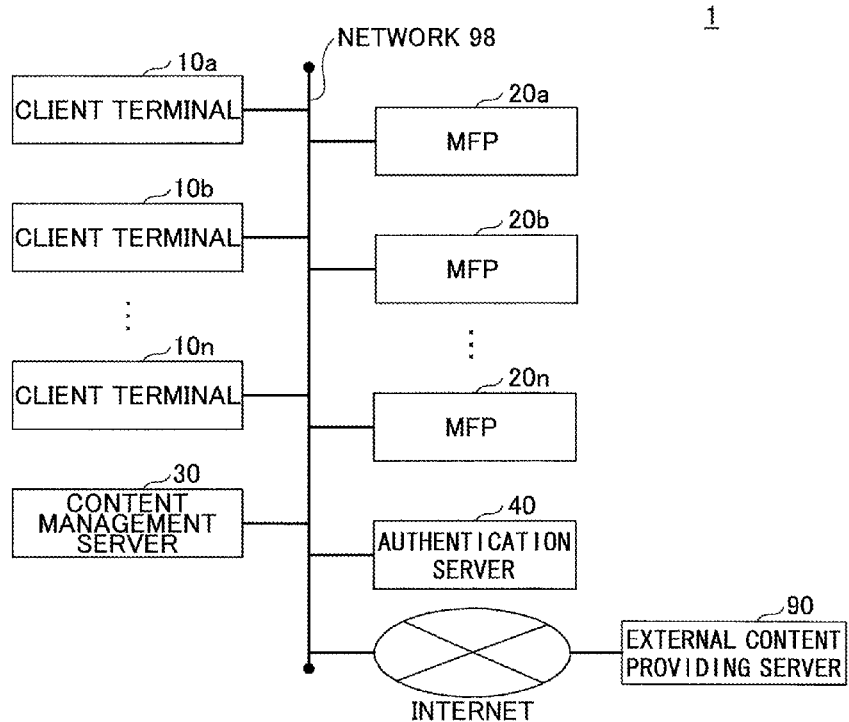

FIGS. 1A and 1B are diagrams illustrating examples of system configurations of an image forming system 1, according to the exemplary embodiment. As shown in FIG. 1A, the image forming system 1 includes client terminals 10a, 10b, . . . 10n (if the respective terminals do not need to be distinguished from each other, denoted as "client terminal 10" in the following), MFPs 20a, 20b, . . . 20n (if the respective MFPs do not need to be distinguished from each other, denoted as "MFP 20", in the following), a content management server 30, and an authentication server 40. The client terminal 10, the MFP 20, the content management server 30 and the authentication server 40 are connected to a wired or wireless network 98, such as a LAN (Local Area Network). According to the above configuration, the authentication server 40 is connected, for example, to the LAN (network 98) in a company, to conduct an authentication process using a user database, which stores information for conducting the user authentication process according to the LDAP (Lightweight Directory Access Protocol). Moreover, since the authentication server 40 also stores content related to personal information of a user of the client terminal 10, the personal information can be managed safely by connecting to the LAN in the company. Furthermore, the content stored in the authentication server 40 may be content registered by the client terminal 10 via the network 98, or may be content delivered via the Internet, to which the network 98 is connected, as shown in FIG. 1B, from a content providing server 90 managed by an external enterprise (an external content providing server), or the like, and registered. Moreover, the authentication server 40 and the content management server 30 may be connected to the Internet, to which the network 98 is connected. Furthermore, a plurality of content management servers 30 may be connected to the network 98, or a plurality of authentication servers 40 may be connected to the network 98.

In the image forming system 1, a print request is transmitted from the client terminal 10 to the MFP 20, and during a wait time beginning when the user of the client terminal 10 performs user authentication at the MFP until the printing ends, a required time for printing and content conforming to the user's attributes are displayed on a displaying device, with which the MFP 20 is equipped. Moreover, the displayed content is prepared taken in account of the required time for printing calculated at the MFP. The content taken in account of the required time for printing is, for example, in the case of a video, a playing time is adjusted to the required time for printing, so as not to interrupt a playing of the video when the printing finishes. The content includes, for example, a plurality of videos, so that the video is played to the end. Moreover, the content according to the present exemplary embodiment is, for example, electronic data of a video and still images including an advertisement of goods, services, or the like, or information indicating an office work item in the company. Furthermore, the attribute of the user (denoted as "a user attribute" in the following) according to the exemplary embodiment is, for example, information indicating a user's gender, a user's age, a user's residence, or the like.

The client terminal 10 is, for example, a computer, which generates print data (document, image data or the like) by using an application software, or the like, receives an input by the user for instructing the printing, and transmits a print request, including the print data and a print condition, to the MFP 20. The user input of user identification information, upon logging into the client terminal 10 and on instructing the printing, uniquely identifies the user. The user identification information is, for example, a user ID or a username, such as an employee number. The user identification information is included in or attached to the print request. The client terminal 10 is, for example, a personal computer (PC).

The MFP 20 is an image forming apparatus which prints print data based on the print request transmitted from the client terminal 10. Moreover, the MFP 20 is an example of the image forming apparatus. The image forming apparatus may be, for example, a printer. Moreover, the MFP 20 is equipped with an authentication controlling function, and controls (restricts) utilizing the MFP 20 for each user. The MFP 20 includes an IC card reader, which reads a user's IC card. Based on identification information read at the IC card reader, the MFP 20, in cooperation with the authentication server 40, performs user authentication. When the user authentication is successful, the user can print the print data, which has been transmitted previously from the client terminal 10 to the MFP 20, for example. Moreover, the MFP 20 acquires content from the content management server 30, and displays the acquired content on the displaying device, with which the MFP is equipped. The displaying device may be an operation panel, installed in the MFP 20, or an external display apparatus connected to the MFP 20. Moreover, the content according to the present exemplary embodiment is, for example, an electronic still image, a video, a voice or a combination thereof. A file type of the content may be, for example, JPEG (Joint Photographic Experts Group), GIF (Graphics Interchange Format), MP3 (Moving Picture Experts Group Audio Layer-3), AVI (Audio Video Interleave), MP4 (MPEG Layer-4), Microsoft PowerPoint (registered trademark), or the like. Furthermore, the contents may be, for example, a file of a still image displaying a notification item in a company displayed to all employees (users). The contents may be a file of a video including advertisement information selected based on the attribute of each user.

The content management server 30 is a computer which manages content displayed on the displaying device of the MFP 20. The content management server 30 generates and transmits a content list, which defines a plurality of contents, which the MFP displays, and an order of displaying the plurality of contents, and transmits a body of the content.

The authentication server 40 is a computer which performs the authentication process at the MFP 20. The authentication server 40, when receiving an authentication request from the MFP 20, performs the authentication process, and transmits a result of the authentication, indicating whether the authentication is successful or not, to the MFP 20.

Moreover, the content management server 30 and the authentication server 40 may be shared by the MFP 20. Furthermore, the content management server 30 may provide a function of the authentication server 40 to the MFP 20.

[Scheme of System Operation]

FIGS. 2A and 2B show an example of a scheme of operation of the image forming system 1 according to the present exemplary embodiment.

When the user operates the client terminal 10 to instruct to print, a print request is transmitted from the client terminal 10 to the MFP 20 (FIG. 2A, step S1). Moreover, the print request includes print data and identification information of the user.

The MFP 20 receives the print request, and calculates a required time for printing based on the print data and a print condition (step S2). The MFP 20 transmits to the content management server 30 a request for generating a content list, the request including the calculated required time for printing and the identification information of the user.

The content management server 30, receives the request for generating a content list, and generates a content list (step S3). Content included in the content list is selected according to the required time for printing and the identification information of the user.

The generated content list will be explained with reference to FIG. 2B. The content management server 30 stores a display time (playing time) of content for a plurality of contents. The MFP notifies the content management server 30 of the required time for printing. FIG. 2B shows an example of the content list, in which contents, "A" to "D", are stored, and the notified required time for printing is 60 seconds. The content management server 30 selects contents taken in account of the required time for printing, and generates a content list. For example, contents included in the content list "a", as shown in FIG. 2B, are "content A (30 seconds)", "content B (20 seconds)", and "content C (15 seconds)". However, the required time for printing (60 seconds) elapses before content C will be completed, i.e. playing content "C" is interrupted. On the other hand, the content list "b" includes "content A (30 seconds)", "content B (20 seconds)" and "content D (10 seconds)". Content "D" is completed before or at the time when the required time for printing elapses. In the present exemplary embodiment, since the content list is required to be generated so that playing the content would not be interrupted, the content list "b" is adopted. The content management server 30, after generating the content list, transmits the generated content list to the MFP 20.

Next, the user presses an IC card, which the user possesses, onto an IC card reader, with which the MFP 20 is equipped, to perform user authentication in order to print the print data by the MFP 20 (step S4). The MFP 20 reads user identification information included in the IC card, and sends an authentication request to the authentication server 40. The authentication server 40 receives the authentication request, and performs an authentication process. The authentication server 40 notifies the MFP 20 of a result of authentication.

The MFP 20 starts, when the notified result of authentication is information indicating success, printing the print data based on the print request. Moreover, the MFP 20 acquires content based on the content list from the content management server 30 and plays (displays) the content (step S5).

The displaying (playing) of the contents according to the content list, which have been previously configured so as to finish within the required time for printing, finishes adjusted to the end of the printing at the MFP 20 (step S6).

The image forming system 1 according to the present exemplary embodiment, as explained above, can display content selected based on a user attribute and a required time for printing. Accordingly, a wait time for printing can be utilized effectively, and content beneficial for the user and for the content provider (advertiser) can be effectively provided. Moreover, since the displayed content finishes within the wait time for printing, the user do not need to waste time only for viewing content, and therefore the user's business is not affected.

[Hardware Configuration]

Figure 3:
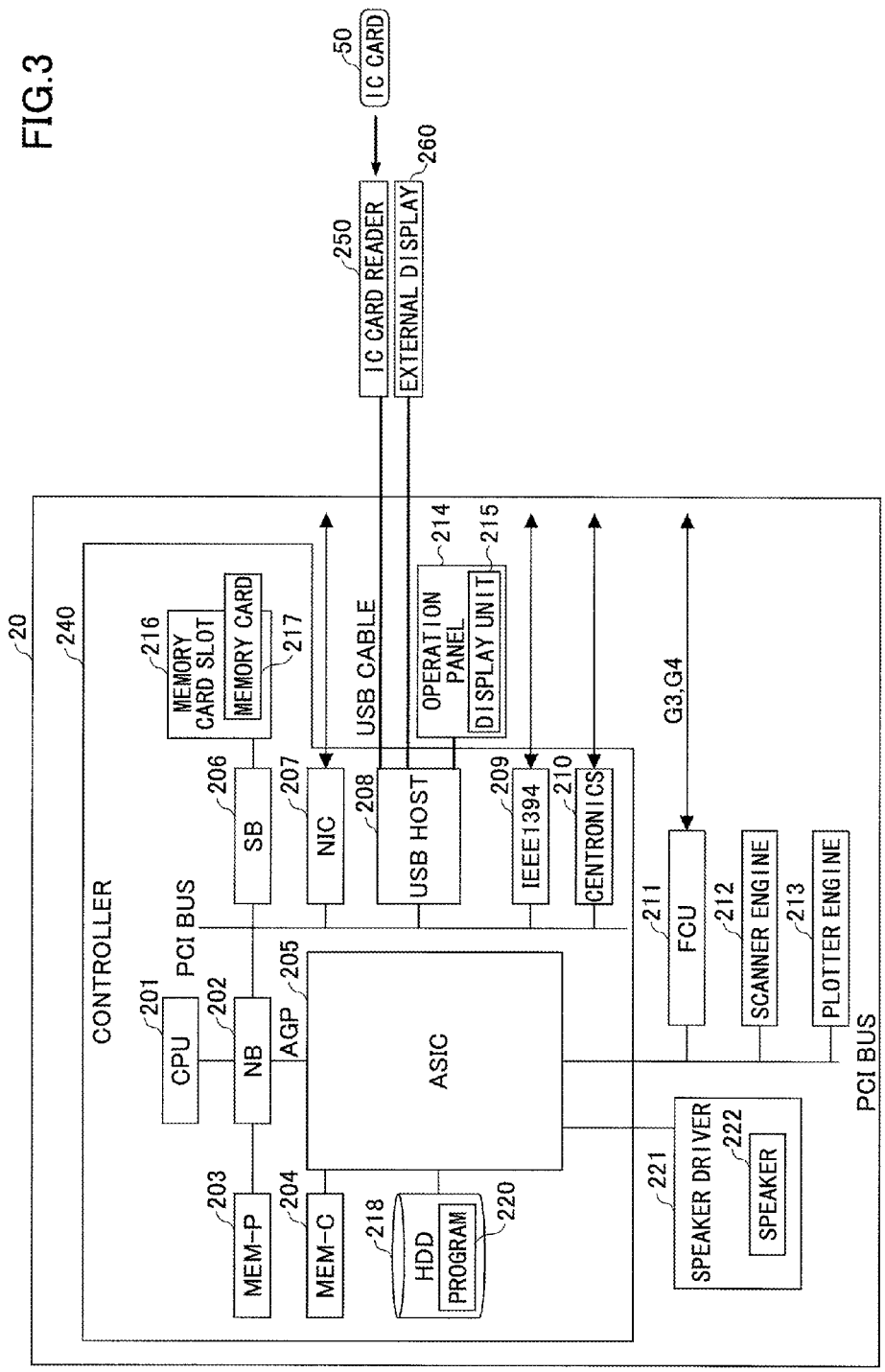
FIG. 3 is a diagram illustrating an example of a hardware configuration of an MFP (multifunction peripheral) according to the exemplary embodiment.

FIG. 3 shows a diagram illustrating an example of a hardware configuration of the MFP 20 according to the present exemplary embodiment.

The MFP 20 includes a controller 240, an operation panel 214, an FCU (facsimile control unit) 211, a scanner engine 212, and a plotter engine 213.

The controller 240 includes a CPU (central processing unit) 201, an ASIC (application-specific integrated circuit) 205, an NB (north bridge) 202, an SB (south bridge) 206, a MEM-P (memory/program, system memory) 203, a MEM-C (memory/constant, local memory) 204, a HDD (hard disk drive) 218, a memory card slot 216, a NIC (network interface controller) 207, a USB (universal serial bus) host 208, an IEEE 1394 device 209, and a centronics device 210.

The CPU 201 is an IC (integrated circuit) that performs various information processes, and executes a program providing an application or a service in a unit of process in parallel based on an operating system (OS), such as Unix (trademark registered) or Linux (trademark registered). The ASIC 205 is an IC that performs imaging process. The NB 202 is a bridge for connecting the CPU 201 and the ASIC 205. The SB 206 is a bridge for connecting the NB 202 and peripheral devices. The ASIC 205 and NB 202 are connected via an AGP (Accelerated Graphics Port).

The MEM-P 203 is a memory connected to the NB 202. The MEM-C 204 is a memory connected to the ASIC 205.

The HDD 218 is a storage connected to the ASIC 205, and used for accumulating image data, document data, programs 220, font data, form data, or the like.

The memory card slot 216 is connected to the SB 206, and used for inserting or placing a memory card 217. The memory card 217 is, for example, a flush memory, such as a USB memory, and used for distributing the program 220.

The NIC 207 is a controller that performs a data communication via a network by using a MAC (media access control) address, or the like.

The USB host 208 is an interface in compliance with the USB standard for connecting via a USB cable an IC card reader 250, an external display 260 and an operation panel 214, which are used for inputting authentication information.

The IC card reader 250 is a card reader that reads information from an IC card 50, and is equipped with a USB connector, which can be connected to the USB host 208. The IC card reader 250 may be embedded in the MFP 20. The IC card 50 may be any type of card as long as user identification information unique to each of the users can be stored. Specifically, the IC card 50 according to the present exemplary embodiment is, for example, a MIFARE (trademark registered) card, a FeliCa (trademark registered) card, or the like. Moreover, the card and the card reader used for the authentication are not limited to the IC card 50 and the IC card reader 250. A magnetic card and a magnetic card reader, or the like, may be employed.

The external display 260 is, for example, a liquid crystal display, an organic EL (electroluminescence) display, or the like, for providing visible information from the MFP 20 to the user. Moreover, the external display 260 may be equipped with a touch panel function. In the present exemplary embodiment, the external display 260 is used for displaying the content for the user.

The operation panel 214 is a hardware for providing visible information from the MFP 20 to the user, including a display unit 215. Moreover, the operation panel 214 is hardware (operation unit) for inputting a user's operation to the MFP 20. The operation panel 214 is equipped with a USB connector, which can be connected to the USB host 208. The FCU 211, the scanner engine 212, and the plotter engine 213 are connected to the ASIC 205 via a PCI (peripheral component interconnect) bus. Moreover, a device for displaying the content is not limited to the external display 260. The content may be displayed on the display unit 215 of the operation panel 214.

The IEEE 1394 device 209 is a device providing a serial port in compliance with the IEEE 1394 standard. The centronics device 210 is a device providing a parallel port in compliance with the centronics specification. The NIC 207, the USB host 208, the IEEE 1394 device 209, and the centronics device 210 are connected with the NB 202 and SB 206 via the PCI bus.

The program 220 includes an OS, middleware, and a program providing a function explained later. The program 220 may be distributed in a form of a file, which can be installed or executed, which is recorded in a recording media readable by a computer. Furthermore, the program 220 may be distributed in a form of a file, which can be installed or executed, from an external server.

A speaker driver 221 converts an electric signal into a sound, and outputs the sound from a speaker 222. In the present exemplary embodiment, the speaker 222 is used for playing content including sound data. The speaker 222 is connected to the ASIC 205. Moreover, the speaker 222 may be a built-in speaker embedded in the MFP 20, and may be an externally-connected speaker connected outside the MFP 20.

The scanner engine 212 optically scans a manuscript placed on a contact glass, performs an A/D (analog-to-digital) conversion for reflected light, performs an imaging process, and generates digital data in a predetermined resolution, which will be called "image data" in the following.

The plotter engine 213 includes, for example, a photoconductor drum of a tandem type. The plotter engine 213 modulates a laser beam based on image data and PDL (page description language) data received from the client terminal 10 (PC), scans the photoconductor drum, and forms a latent image. An image for one page, developed by attaching toner onto the latent image, is transferred to a paper. The transferred image is fixed by heating and applying pressure on it. The plotter engine 213 is not limited to the electrophotographic type, but may be a plotter engine of an ink-jet type that forms an image by discharging ink droplets.

The FCU 211 may be connected to the network via the NIC 207, and send or receive image data according to the communication procedure corresponding to the T.37 or T.38 standard. The FCU 211 may be connected to a public communication network and send or receive image data according to the communication procedure corresponding to the G3 or G4 standard. Moreover, even if the FCU 211 receives image data during when power is not supplied to the MFP 20, the plotter engine 213 is activated and the image data can be printed on a recording medium.

The MFP 20 according to the present exemplary embodiment, according to the hardware configuration as explained above, realizes the plural functions of a copier, a printer, a facsimile apparatus, a scanner and the like, a function of authentication, a function of displaying content, and the like.

[Client Terminal]

Figure 4:
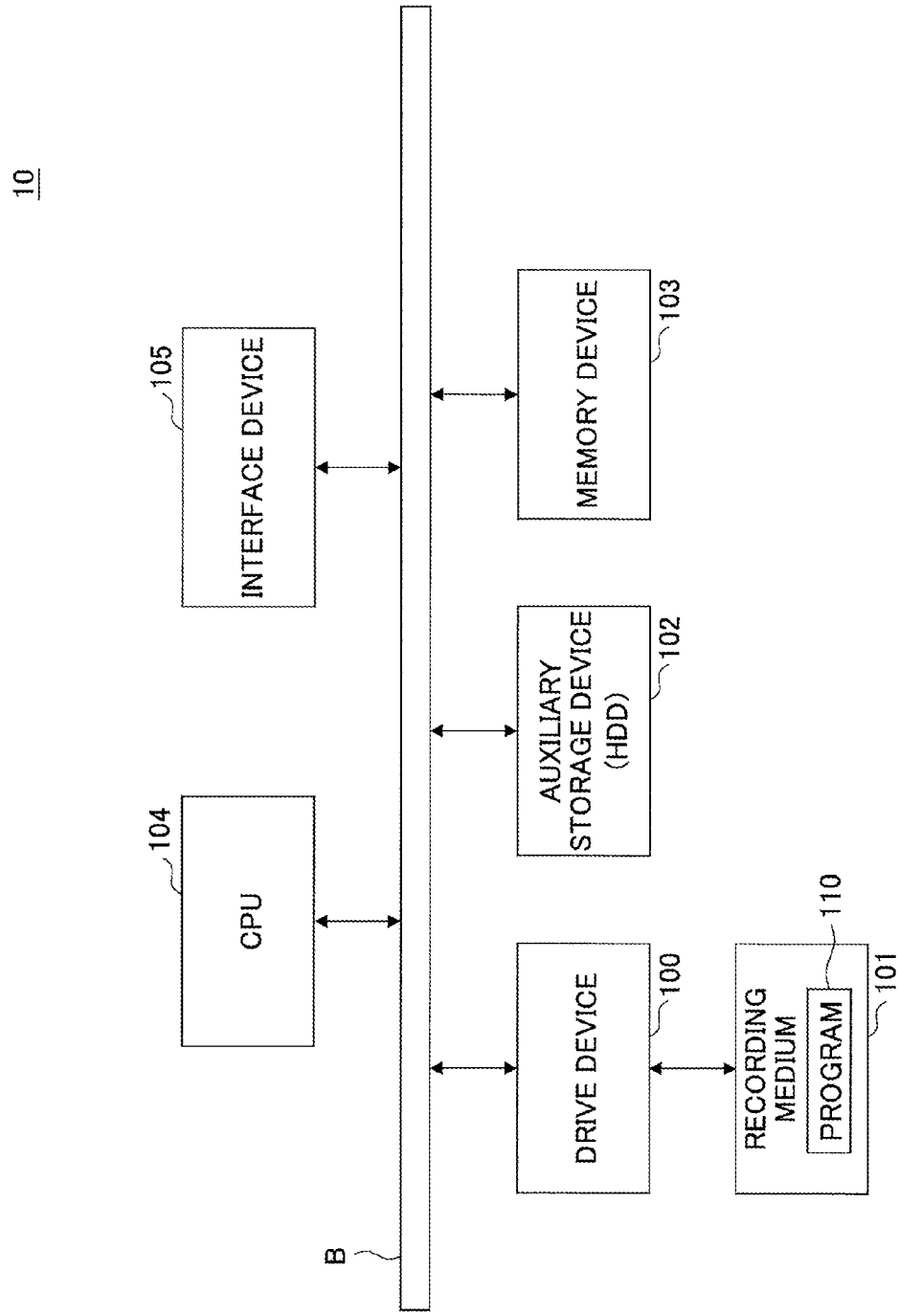
FIG. 4 is a diagram illustrating an example of a hardware configuration of a client terminal according to the exemplary embodiment.

FIG. 4 shows an example of a hardware configuration of the client terminal 10 according to the present exemplary embodiment. The client terminal 10 includes a drive device 100, an auxiliary storage device 102, a memory device 103, a CPU 104 and an interface device 105. These devices are connected to each other via a bus "B".

A program 110, which realizes a process in the client terminal 10, is provided by a recording medium 101, such as a CD-ROM (compact disk read-only memory). The CD-ROM 101 storing the program 110 is placed in the drive device 100, and the program 110 is installed in the auxiliary storage device 102 from the recording medium 101 via the drive device 100. Distributing the program 110 is not limited to installation from the recording medium, as above. The program 110 may be distributed by downloading from another computer, the network, etc.

The auxiliary storage device 102 stores necessary files, a document to be printed, an image to be printed or the like, in addition to the program 110 installed as above. The auxiliary storage device 102 is a non-volatile memory, such as a HDD (hard disk drive), a SSD (solid state drive), or the like.

The memory device 103, when an instruction for activating the program 110 is issued, runs the program 110 from the auxiliary storage device 102, and holds the program. The memory device 103 is, for example, a DIMM (dual in-line memory module), a SO-DIMM (small outline dual in-line memory module), or the like. The CPU 104 executes a function regarding the client terminal 10 according to the program 110 held in the memory device 103. The interface device 105 is, for example, a network card for connecting to a network, such as Ethernet (trademark registered).

[Content Management Server]

Figure 5:
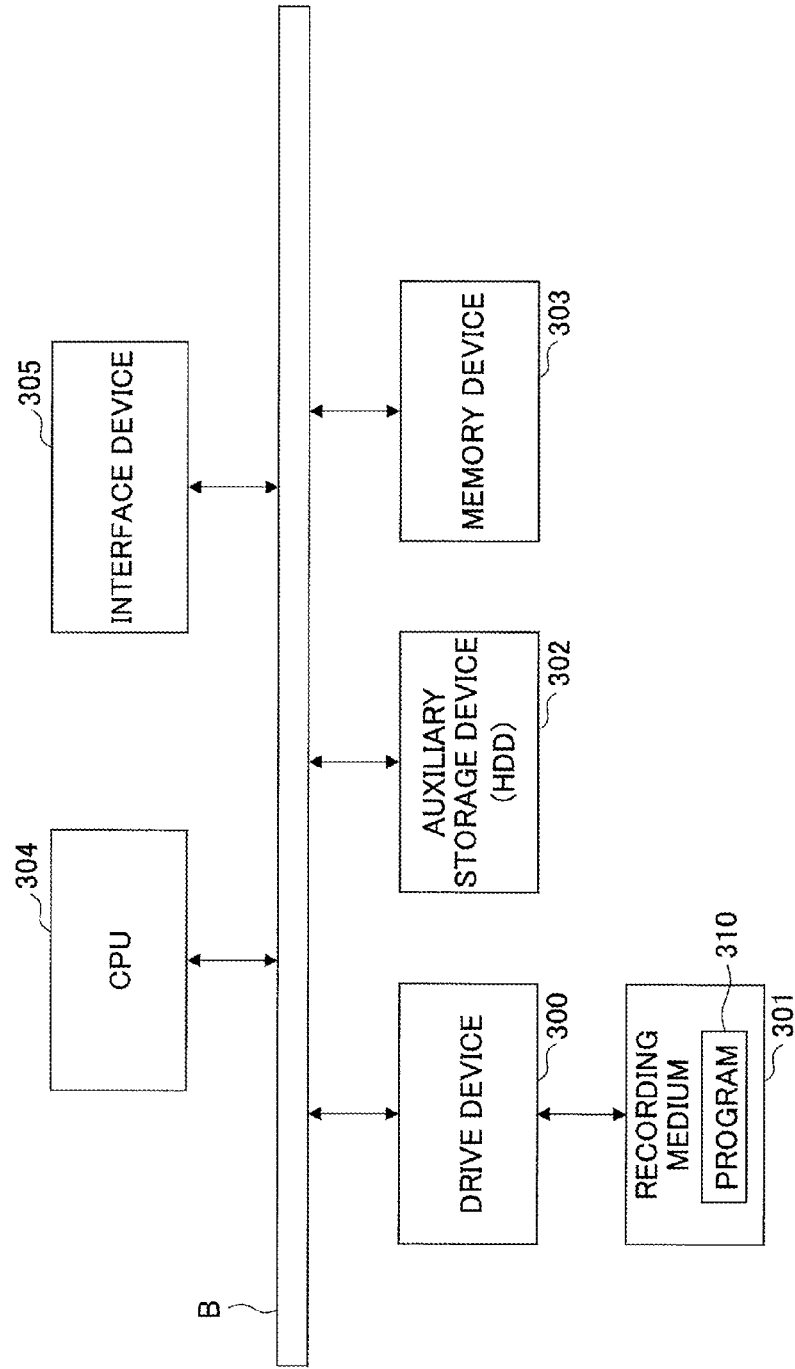
FIG. 5 is a diagram illustrating an example of a hardware configuration of a content management server according to the exemplary embodiment.

FIG. 5 is a diagram illustrating a hardware configuration of the content management server 30 according to the present exemplary embodiment. The content management server 30 includes a drive device 300, an auxiliary storage device 302, a memory device 303, a CPU 304 and an interface device 305. These devices are connected to each other via a bus "B".

A program 310, which realizes a process in the content management server 30, is provided by a recording medium 301, such as a CD-ROM. The CD-ROM 301 storing the program 310 is placed in the drive device 300, and the program 310 is installed in the auxiliary storage device 302 from the recording medium 301 via the drive device 300. Distributing the program 310 is not limited to installation from the recording medium, as above. The program 310 may be distributed by downloading from an other computer, the network, etc.

The auxiliary storage device 302 stores necessary files, data of content to be displayed on the MFP 20, in addition to the program 310 installed as above. The auxiliary storage device 302 is a non-volatile memory, such as a HDD, an SSD, or the like. A file type of content data stored in the auxiliary storage device 302 is, for example, a file type of a still image, a video, or a voice, such as JPEG, GIF, MP3, AVI, MP4, Microsoft PowerPoint (registered trademark), or the like.

The memory device 303, when an instruction for activating the program 310 is issued, runs the program 310 from the auxiliary storage device 302, and holds the program. The memory device 303 is, for example, a DIMM, a SO-DIMM, or the like. The CPU 304 executes a function regarding the content management server 30 according to the program 310 held in the memory device 303. The interface device 305 is, for example, a network card for connecting to a network, such as Ethernet (trademark registered).

[Authentication Server]

Figure 6:
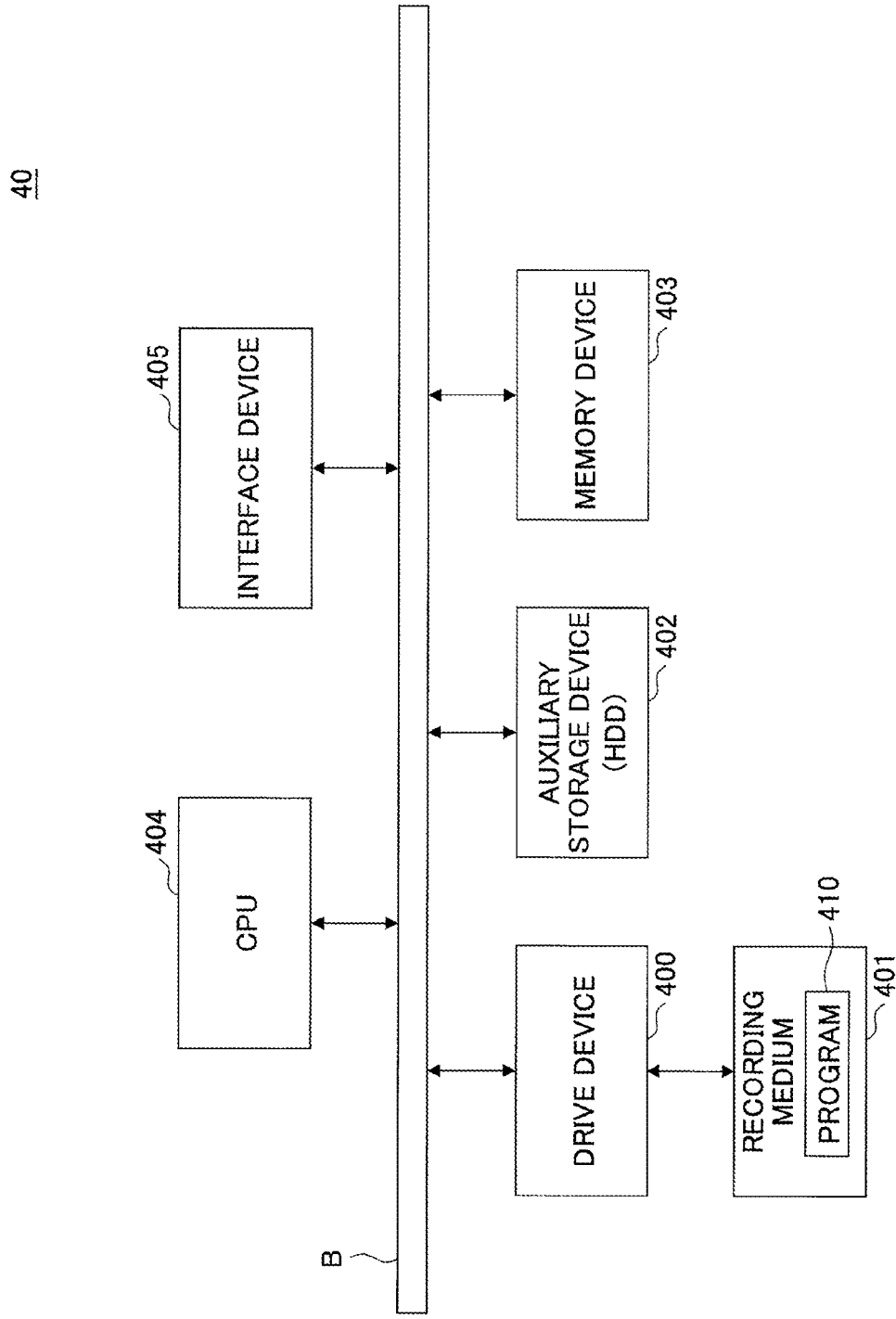
FIG. 6 is a diagram illustrating an example of a hardware configuration of an authentication server according to the exemplary embodiment.

FIG. 6 shows an example of a hardware configuration of the authentication server 40 according to the present exemplary embodiment. The authentication server 40 includes a drive device 400, an auxiliary storage device 402, a memory device 403, a CPU 404 and an interface device 405. These devices are connected to each other via a bus "B".

A program 410, which realizes a process in the authentication server 40, is provided by a recording medium 401, such as a CD-ROM. The CD-ROM 401 storing the program 410 is placed in the drive device 400, and the program 410 is installed in the auxiliary storage device 402 from the recording medium 401 via the drive device 400. Distributing the program 410 is not limited to installation from the recording medium, as above. The program 410 may be distributed by downloading from an other computer, the network, etc.

The auxiliary storage device 402 stores necessary files, a document to be printed, an image to be printed or the like, in addition to the program 410 installed as above. The auxiliary storage device 402 is a non-volatile memory, such as a HDD, an SSD, or the like.

The memory device 403, when an instruction for activating the program 410 is issued, runs the program 410 uploaded from the auxiliary storage device 402, and holds the program. The memory device 403 is, for example, a DIMM, a SO-DIMM, or the like. The CPU 404 executes a function regarding the authentication server 40 according to the program 410 held in the memory device 403. The interface device 405 is, for example, a network card for connecting to a network, such as Ethernet (trademark registered).

The authentication server 40, having the hardware configuration, as explained above, performs the user authentication process according to LDAP, or the like, based on the user information input from the MFP 20.

[Functional Configuration]

Figure 7:
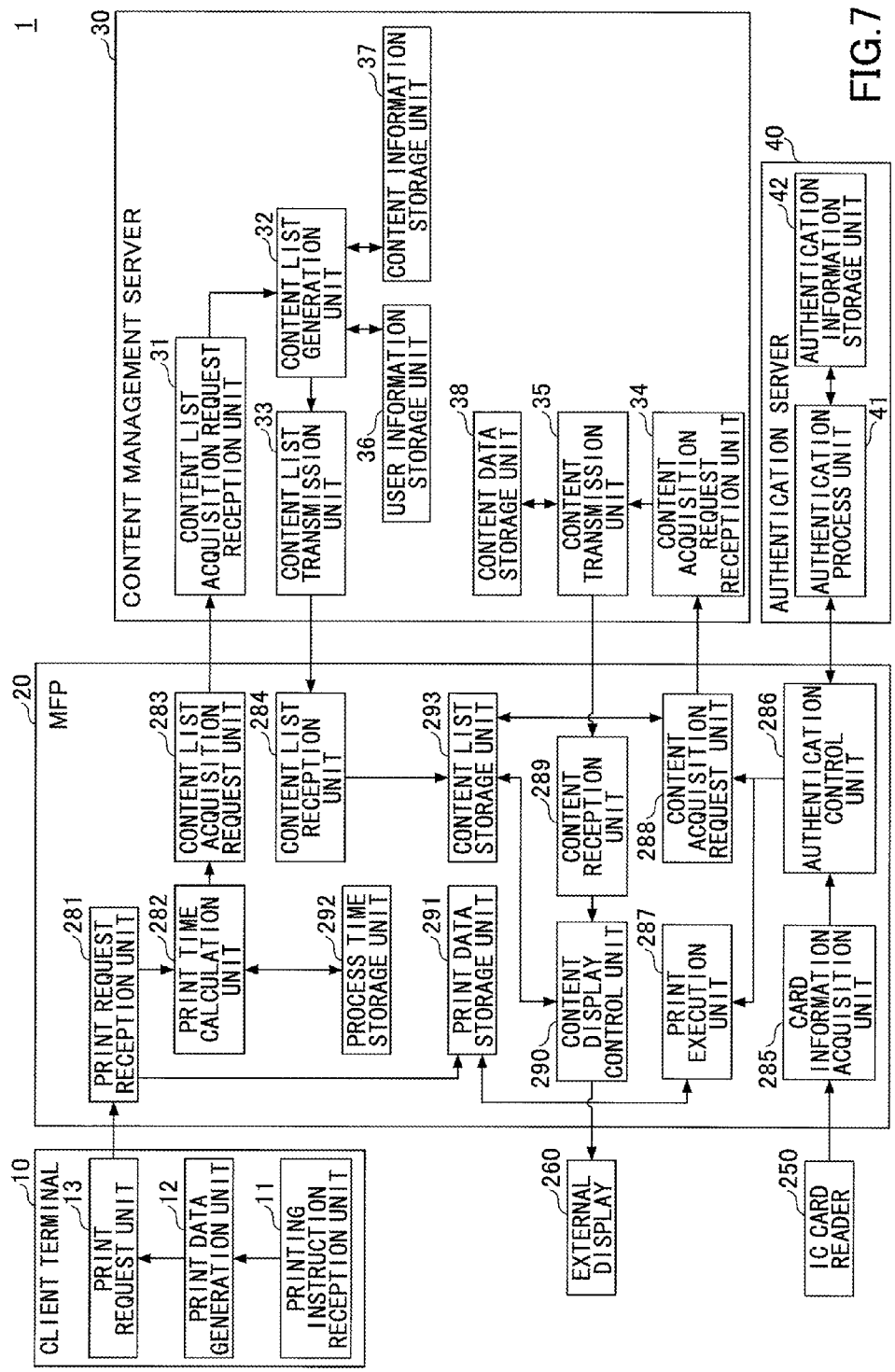
FIG. 7 is a diagram illustrating an example of a functional configuration of the image forming system according to the exemplary embodiment.

FIG. 7 is a diagram illustrating an example of a functional configuration of the image forming system 1 according to the present exemplary embodiment.

[Client Terminal]

The client terminal 10 includes a printing instruction reception unit 11, a print data generation unit 12, and a print request unit 13. The above units are realized by a process executed at the CPU 101 of the client terminal 104 according to the program 110, installed in the client terminal 10.

The printing instruction reception unit 11 receives an instruction for specifying document data to be printed. Moreover, the printing instruction reception unit 11 displays a screen image for setting a print condition (also called "printing attribute information" or "print setting item") on the display device of the client terminal 10, or the like. The screen image for setting a print condition is also called "print setting screen". The printing instruction reception unit 11 receives an operation of setting the print condition and an input of an instruction for printing. The print condition includes setting information, such as the number of pages, a double-sided print process, a stapling process, a punching process, color printing, aggregate printing, a stapling position for the stapling process, a punching position for the punching process, or the like.

The print data generation unit 12 generates print data, for the document data to be printed, based on the print condition. The print data is data described in the PDL and includes also the print condition. The print request unit 13 transmits to the MFP 20 a print request including the generated print data and user identification information (such as the user ID), which was input when the user logged into the client terminal 10. Moreover, the printing instruction reception unit 11 and the print data generation unit 12 are, for example, realized by a printer driver. The printer driver may be installed in the client terminal 10. The printer driver may be installed in an other computer. In the latter case, a mechanism for sharing printers, provided by the OS, may be used.

[MFP]

The MFP 20 includes a print request reception unit 281, a print time calculation unit 282, a content list acquisition request unit 283, a content list reception unit 284, a card information acquisition unit 285, an authentication control unit 286, a print execution unit 287, a content acquisition request unit 288, a content reception unit 289, a content display control unit 290, a print data storage unit 291, a process time storage unit 292, and a content list storage unit 293. The above units are realized by a process executing at the CPU 201 of the MFP according to the program 220, installed in the MFP 20.

The print request reception unit 281 receives a print request transmitted from the client terminal 10. The print request reception unit 281 associates the print data, included in the received print request, with the user identification information, and stores the print data in the print data storage unit 291.

The print time calculation unit 282 calculates a required time for printing which is required for printing the print data, based on the print data and the print condition of the print data, by using information stored in the process time storage unit 292.

The process time storage unit 292 stores a process time, and the like, for each process corresponding to the print condition. Moreover, the process time is adjusted previously by the administrator or the like taken into account of the performance of the MFP 20, such as the process speed of printing. FIG. 8 is a table illustrating an example of the information stored in the process time storage unit 292 of the MFP 20 according to the present exemplary embodiment. The process time storage unit 292 stores, as shown in FIG. 8, "ID" for identification information for each size of paper to be printed, "paper size", "print time for first page", "print time for second page or more", "coefficient for double-sided print", "additional time for stapling process", "transition time to next print job", and the like. "Paper size" is information indicating a size of paper to be printed. "Print time for first page" is information representing a time required for printing the first page, and is denoted here by "t1" (seconds). "Print time for second page or more" is information representing a time, "t2" (seconds), required for printing the second page or more, per each page. "Coefficient time for double-sided printing" is information representing a coefficient, "d", by which the print time obtained by the number of pages using the above information is multiplied, in order to estimate a print time for double-sided printing. A coefficient "d" for single-sided printing is 1. "Additional time for stapling process" is information representing a time, "s" (seconds), required for the stapling process. "Transition time to next print job" is information representing a time, "m" (seconds), required to the start of the next print job from the end of the present print job, in the case of conducting plural print jobs. Meanwhile, the information stored in the process time storage unit 292 is not limited to the example of FIG. 8. Other print conditions, such as aggregate printing, may be taken into account.

Figure 9:
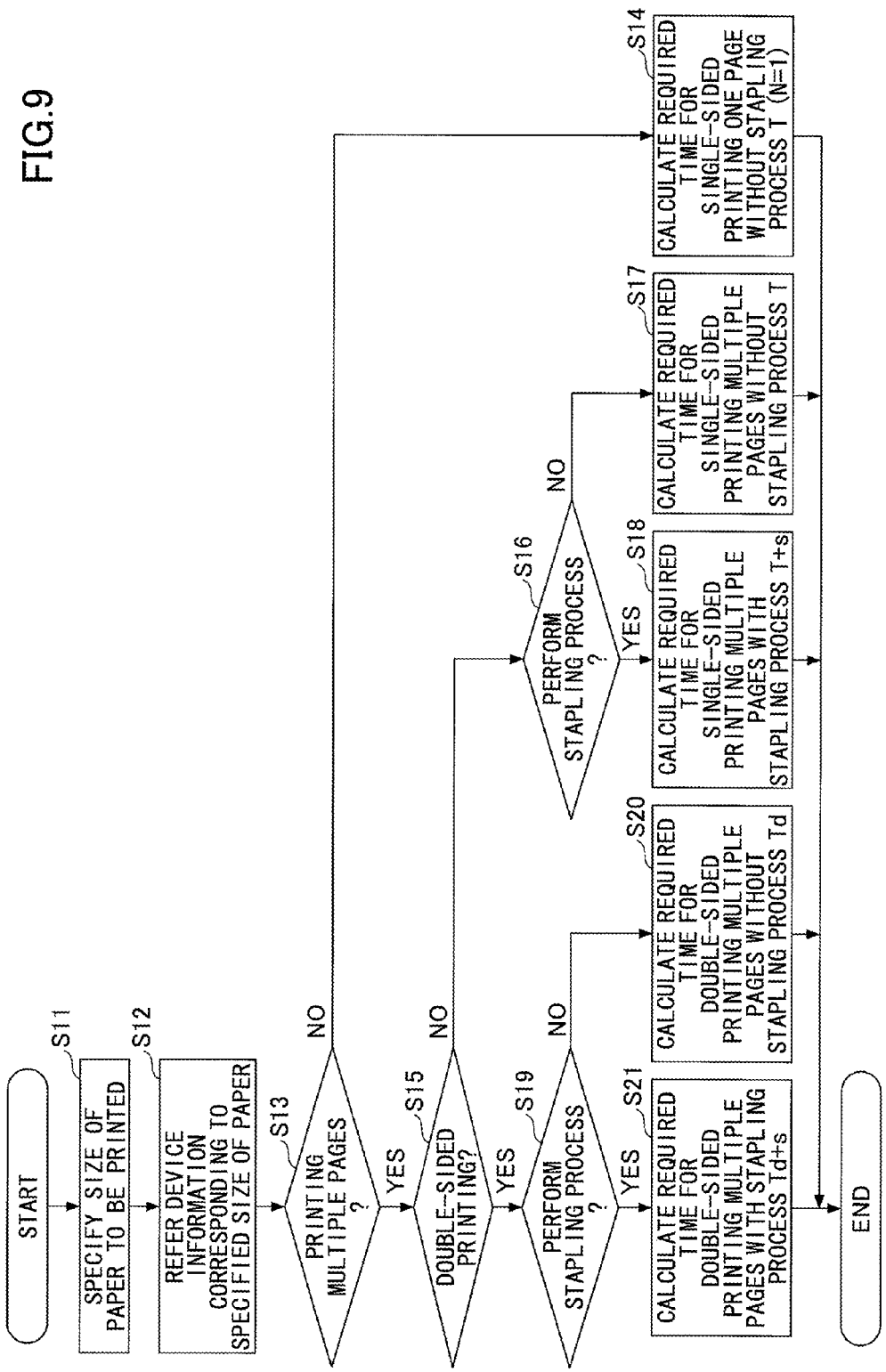
FIG. 9 is a flowchart illustrating an example of a process of calculating required time for printing in the MFP according to the exemplary embodiment.

Next, the procedure of calculating the required time for printing at the print time calculation unit 282 will be explained. FIG. 9 is a flowchart illustrating an example of the procedure of calculating the required time for printing at the MFP 20 according to the present exemplary embodiment. A required time for single-sided printing for N pages without the stapling process, "T" (seconds), is estimated, based on the stored information shown in FIG. 8, $$T = t1 + t2*(N-1). \qquad \text{(Formula 1)}$$

In the following explanation, the required time for printing in each print code will be presented using the above-described notations, as in Formula 1.

At first, the print time calculation unit 282 specifies a size of paper to be printed according to the print code included in the print data (step S11). Next, referring to the device information stored in the process time storage unit 292, a required time for printing corresponding to the specified size of paper is obtained (step S12).

The print time calculation unit 282, from the print code, determines whether to print multiple pages or not (step S13).

In the case of printing a single page (step S13 NO), a required time for printing one page (single-sided printing, without the stapling process) is calculated (step S14). According to Formula 1, since the number of pages is one (N=1) in this case, the required time for printing is "t1" (seconds).

On the other hand, in the case of printing multiple pages (step S13 YES), the print time calculation unit 282 further determines whether to perform the double-sided printing or not (step S15).

In the case of not performing the double-sided printing (step S15 NO), i.e. single-sided printing is performed, the print time calculation unit 282 further determines whether to perform the stapling process or not (step S16). In the case of not performing the stapling process (step S16 NO), the required time for single-sided printing multiple pages without the stapling process is calculated (step S17). The required time for printing is "T" (seconds) according to Formula 1. On the other hand, in the case of performing the stapling process (step S16 YES), the required time for single-sided printing of multiple pages with the stapling process is calculated (step S18). The required time for printing is, by adding the additional time for the stapling process, "s", as shown in FIG. 8, to "T" in Formula 1, "T+s" (seconds).

Furthermore, in the case of performing the double-sided printing (step S15 YES), the print time calculation unit 282 further determines whether to perform the stapling process (step S19). In the case of not performing the stapling process (step S19 NO), the required time for double-sided printing for multiple pages without the stapling process is calculated (step S20). The required time for printing is, by multiplying "T" in Formula 1 by the coefficient time for double-sided printing, "d", as shown in FIG. 8, "Td" (seconds). Furthermore, in the case of performing the stapling process (step S19 YES), the required time for double-sided printing for multiple pages with the stapling process is calculated (step S21). The required time for printing is, by multiplying "T" by "d" and adding "s" to it, "Td+s" (seconds).

Furthermore, in a case where the next print job is performed in succession, the transition time to the next print job, "m", is added to the calculated print time, as described above. The calculation process, as shown by FIG. 9, is performed for the next print job.

The print time calculation unit 282, as explained above, can calculate the required time for printing, based on the print condition and the process time and the coefficient corresponding to the print condition stored in the process time storage unit 292.

The method of calculating the required time for printing is not limited to the calculating method, as explained above. The required time for printing may be calculated taken in account of, for example, a print time presented by a manufacturer of the MFP 20, a path length of transporting paper, which will be different for each paper feeding tray or paper receiving tray, or whether a print data includes image data or not.

With reference to FIG. 7, the process of generating a content list will be explained as follows.

The content list acquisition request unit 283 generates a content list acquisition request for acquiring from the content management server 30 a content list including content to be displayed on the external display 260, with which the MFP 20 is equipped. The content list acquisition request includes user identification information of the user of the client terminal 10, which issued the print request, and the required time for printing calculated by the print time calculation unit 282. The content list acquisition request unit 283 transmits the generated content list acquisition request to the content management server 30.

The content list reception unit 284 receives the content list transmitted from the content management server 30. The content list reception unit 284 stores the received content list in the content list storage unit 293.

The content list storage unit 293 stores the content list associated with the user identification information. FIG. 10 shows an example of information stored in the content list storage unit 293 of the MFP 20 according to the present exemplary embodiment. As shown in FIG. 10, the content list stored in the content list storage unit 293 includes "list ID", "user identification information", "content ID", "name of content", "source of content", "display time", "display order", and the like. The "list ID" is a number identifying a content list. The "user identification information" is a number identifying a user who requires the printing. In the example, as shown in FIG. 10, the user identification information, "user A", corresponds to the list ID "1", i.e. a content list with the list ID "1" is for the user "A". The "content ID" is a number identifying content in the content management server 30. The "content ID" is used for specifying content to be acquired, when the MFP 20 acquires a body of content from the content management server 30. The "content name" is a name of content displayed on the external display 260 of the MFP 20. The "content source" is a name of an organization that provides the content, such as a company, a shop, or a section of a company. The "display time" is a time period for displaying (playing) the content. The "display order" is an order of displaying contents in the same content list.

With reference to FIG. 7, the process of authenticating a user will be explained as follows.

The card information acquisition unit 285 acquires card information read by the IC card reader 250 from the IC card 50. The card information, described as above, is user identification information of a user who carries the card 50. The authentication control unit 286 transmits an authentication request, including the acquired user identification information, to the authentication server 40, which performs the authentication process. The authentication control unit 286 receives a result of authentication for the authentication request transmitted from the authentication server 40. When the result of authentication includes information indicating that the authentication is successful, the authentication control unit 286 notifies the print execution unit 287 and the content acquisition request unit 288 of the success of the authentication and of the user identification information. The user authentication performed at the MFP 20 according to the present exemplary embodiment is not limited to the IC card authentication, as explained above. However, the authentication may be biometric authentication, such as fingerprint authentication, vein authentication, iris authentication, or the like, or may be a method for identifying a user individually by a combination of a user ID (username) and a password.

The print execution unit 287 prints print data corresponding to the user (user identification information), who has succeeded in authenticating. The print execution unit 287, after notification of the result of authentication, may display a listing of print jobs on the external display 260, or the like, and then print print data of a print job selected by the user based on the listing of the print jobs.

The content acquisition request unit 288 acquires content ID of content to be displayed from the content list storage unit 293 based on the user identification information. The content acquisition request unit 288 generates a content list acquisition request including the acquired content ID, and transmits the request to the content management server 30.

Figure 11:
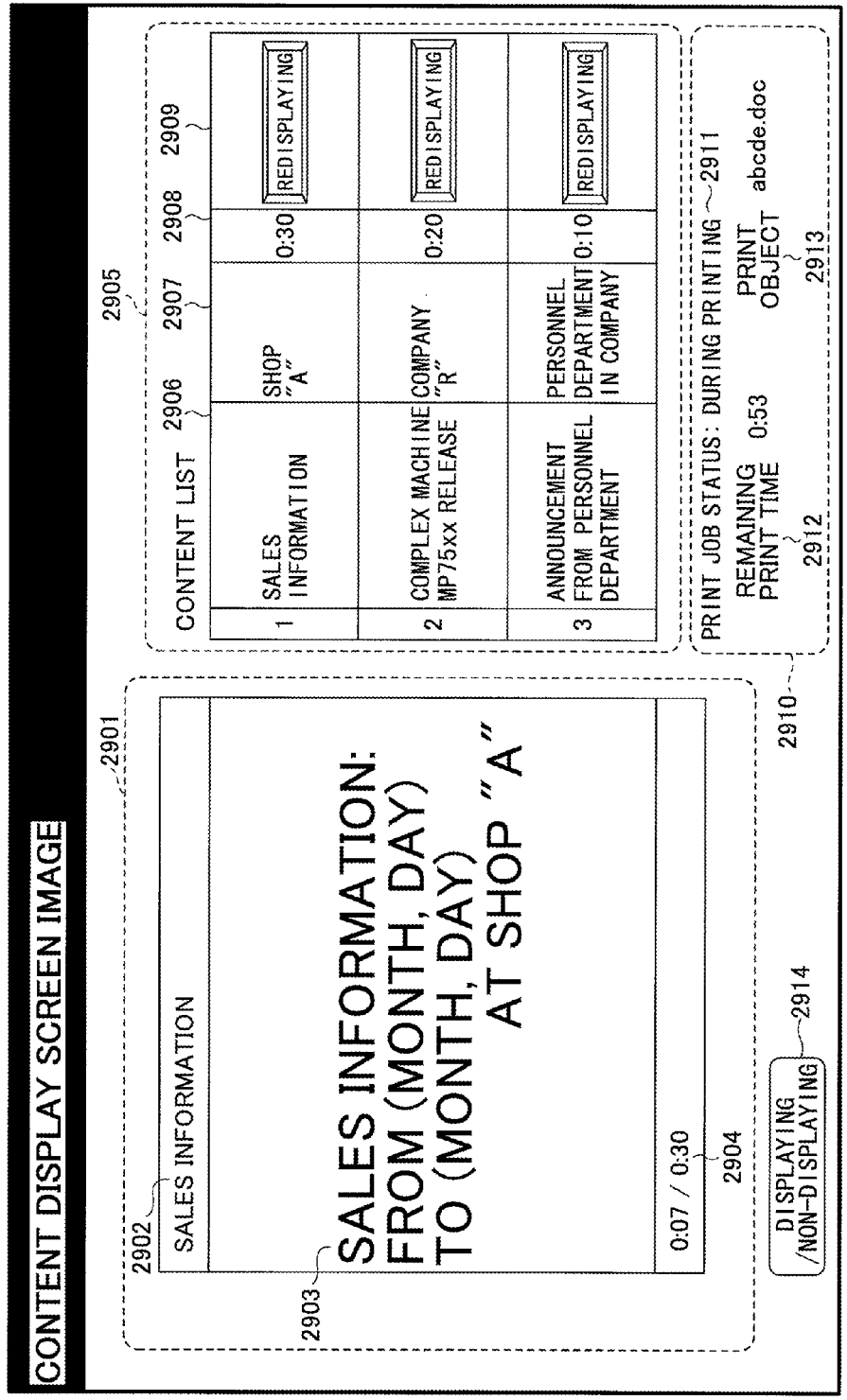
FIG. 11 is a diagram illustrating an example of a content display screen image displayed on a display device according to the exemplary embodiment.

The content reception unit 289 receives content from the content management server 30. The content reception unit 289 notifies the content display control unit 290 of the received content. The content display control unit 290 generates a content display screen image, in which the content is displayed on the external display 260, as shown in FIG. 11 and will be described later. The content notified by the content reception unit 289 is displayed on the external display 260. In the present exemplary embodiment, displayed content is controlled in a streaming format, employing RTSP (Real Time Streaming Protocol), or the like. According to the above method, the time until the content is displayed is shortened, and the storage space in the MFP will be reduced, compared with the case where, after downloading all the content included in the content list, the MFP 20 displays the content. Displayed content is not limited to displaying of a streaming type. The content may be displayed, after downloading all the content included in the content list, in the case where the communication rate of the transmission path between the MFP 20 and the content management server 30 is fast enough, or the storage capacity of the MFP 20 is large enough.

FIG. 11 shows an example of content display screen image on the external display 260 according to the present exemplary embodiment. As shown in FIG. 11, the content display screen image includes a content display region 2901 for displaying (playing) the received content, a content list display region 2905 for displaying the content list, a print job status region 2910 and a display/no-display button 2914. Information included in the content display region 2901 is generated based on the content received by the content reception unit 289. The content display region 2901 includes a content name display part 2902, a content display part 2903 and a content playing time display part 2904. The content list display region 2905 includes a content name display item 2906, a content source display item 2907, a playing time display item 2908, a redisplay button 2909. Information included in the content list display region 2905 is generated based on the content list storage unit 293. The redisplay button 2909 is a button, which can be depressed only after all the contents of the content list are displayed (played), and used when the user wants the contents to be redisplayed after the display process for the contents ends. The print job status region 2910 includes a print job status display part 2911, a remaining print time display part 2912 and a print object display part 2913 displaying a name of document data to be printed. By depressing the display/no-display button 2914, the content display screen image is displayed or not displayed.

Details of the content management server 30 will be explained with reference to FIG. 7.

The content management server 30 includes a content list acquisition request reception unit 31, a content list generation unit 32, a content list transmission unit 33, a content acquisition request reception unit 34, a content transmission unit 35, a user information storage unit 36, a content information storage unit 37 and content data storage unit 38. The above units are realized by a process executing at the CPU 304 of the content management server 30 according to the program 310, installed in the content management server 30.

The content list acquisition request reception unit 31 receives a content list acquisition request transmitted from the MFP 20. The content list acquisition request reception unit 31 notifies the content list generation unit 32 of user identification information and a required time for printing included in the content list acquisition request.

The content list generation unit 32, based on the user identification information, reads out a user attribute from the user information storage unit 36. Next, the content list generation unit 32, based on the required time for printing and the user attribute, generates a content list from the content information storage unit 37. A procedure of generating the content list will be described later with reference to FIG. 14.

The user information storage unit 36 stores the user attribute and the like, associating with the user identification information, by using the memory device 303, auxiliary storage unit 302 or the recording medium 301. FIG. 12 shows an example of information stored in the user information storage unit 36 according to the present exemplary embodiment. As shown in FIG. 12, the user information storage unit 36 stores a "managing ID" for unique identifying information for each user identification information in the user information storage unit 36, "user identification information", a "user name", "advertising content display permission/rejection flag", a "gender", a "date of birth", an "age" and a "residential area". The "user identification information" is, for example, a user ID, such as an employee number. The "user name" is a name of the user. The "advertising content display permission/rejection flag" is a flag setting whether to permit or reject displaying advertising content, which concerns advertising during a wait time when the printing is executed. In the case that the user rejects displaying advertising content, the "advertising content display permission/rejection flag" is set to "no". The "gender", the "date of birth", and the "age" are information representing the user attribute. The "residential area" is, in the example shown in FIG. 12, specified in a prefectural unit. The scope of the "residential area" is not limited to the above. The "residential area" may be specified in a municipal unit. The information stored in the user information storage unit 36 has been previously input by an administrator.

The content information storage unit 37 stores the content and an attribute of the content by using the memory device 303, the auxiliary storage device 302 or the recording medium 301. FIG. 13 shows an example of information stored in the user information storage unit 36 according to the present exemplary embodiment. As shown in FIG. 13, the content information storage unit 37 stores a "content ID", a "name of the content", a "source of the content", a "display time", a "gender of the object", a "minimum age limit of the object", an "upper age limit of the object", "residential area of the object", a "priority indication flag", a "class of the content", and the "identification information of displayed user". The "content ID" is a number uniquely identifying the content. The "name of the content" is a name of the content. The "content source" is a name of the organization that provides the content, such as a company, a shop, or a section of a company. The "display time" is a time period for displaying (playing) the content. The "gender of the object" is a gender of an object, for whom the content is displayed. The option "n/a" (not applicable) indicates that the content may be displayed for both genders. The "minimum age limit of the object" and "upper age limit of the object" are minimum and upper age limits of the object, respectively, for whom the content is displayed. The option "n/a" indicates that minimum and upper age limits are not set. The "residential area of the object" is a residential area of the object, for whom the content is displayed. The option "n/a" indicates that the content may be displayed in any residential area. The "priority indication flag" is attached when the content is to be preferentially displayed. The content, in which information indicating "priority" is set to the "priority indication flag", is preferentially selected on generating the content list. Specifically, for example, as shown in FIG. 13, the content with the content ID, "0101", the name of the content, "Announcement from Personnel Department", has the priority indication flag, "priority". Accordingly, displaying this content is mandatory for all users, and this content is displayed prior to other content, to which "priority" is not set. The "class of the content" is a class obtained by classifying content based on the aim of the content. For an advertising content, which aims at advertising, "advertisement" is set. For an administrative content, which aims at an administrative announcement in a company, "administrative announcement" is set. The "identification information of the displayed user" indicates identification information of the user, for whom the content has already been displayed. Moreover, the information stored in the content information storage unit 37 is set by the administrator or the like, in advance. Furthermore, the "identification information of the displayed user" is set after the content is transmitted to the MFP 20.

Figure 14:
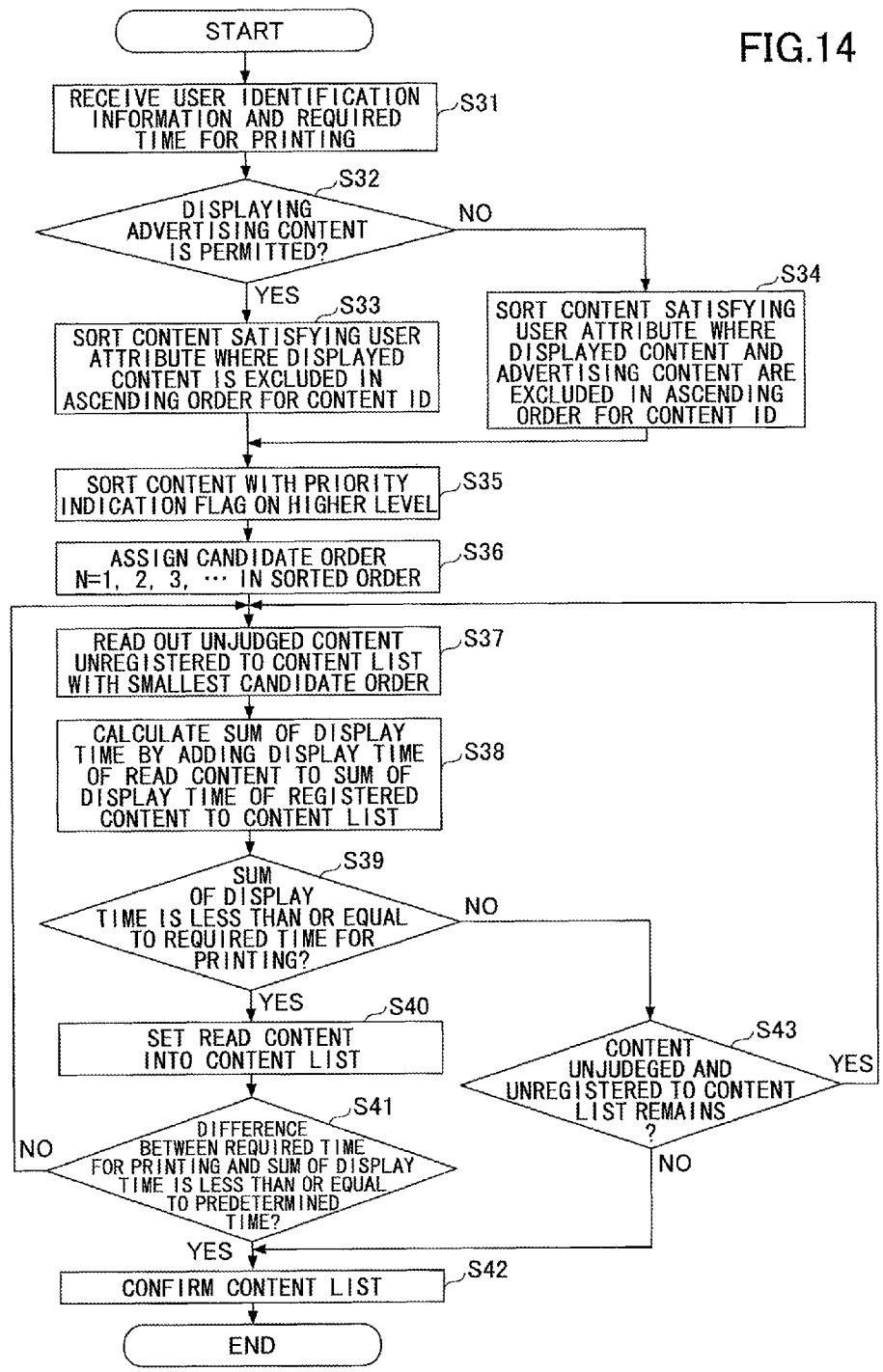
FIG. 14 is a flowchart illustrating an example of a process of creating a content list in the content management server according to the exemplary embodiment.

Next, a procedure for the process of generating the content list by the content list generation unit 32 will be described as follows. FIG. 14 is a flowchart illustrating an example of the procedure for the process of generating the content list at the content management server 30 according to the present exemplary embodiment.

The content list acquisition request reception unit 31 of the content management server 30 receives a content acquisition request, including user identification information and a required time for printing, transmitted from the MFP 20 (step S31). The content list acquisition request reception unit 31 notifies the content list generation unit 32 of the user identification information and the required time for printing.

The content list generation unit 32 determines whether the advertising content is set to "permitted" or not, with reference to the "advertising content display permission/rejection flag", corresponding to the user identification information notified by the user information storage unit 36.

In the case that the advertising content is permitted (step S32 YES), the content list generation unit 32, referring to the user information storage unit 36 and the content information storage unit 37, sorts the contents, which satisfies the user attribute where content, which has been displayed, is excluded, in ascending order for the "content ID" (step S33). Specifically, the content list generation unit 32 reads out the user attribute corresponding to the user identification information ("gender", "age" and "residential area") from the user information storage unit 36. Next, the content list generation unit 32, referring to the "identification information of displayed user" in the content information storage unit 37, extracts the contents, in which the identification information of the displayed user is not set, i.e. which has not been displayed to the user. Next, the content list generation unit 32, based on the user attribute, read out as above, specifies content, which satisfies the condition for the "gender of the object", the "minimum age limit of the object", the "upper age limit of the object", and the "residential area of the object", corresponding to the identification information, from the extracted contents. Furthermore, the content list generation unit 32 sorts the specified contents in an ascending order for the content ID.

On the other hand, in the case that the advertising content is not set to be permitted (step S32 NO), the content list generation unit 32, sorts the contents, which satisfy the user attribute where content, which has been displayed, and advertising contents are excluded, in an ascending order for the "content ID" (step S34). The content list generation unit 32, referring to the "class of the content" in the content information storage unit 37, excludes the contents, to which "advertising" flag is set from the contents to be sorted.

Next, after the end of the process of step S33 or S34, the content list generation unit 32 further sorts the sorted contents, so that content, in which "priority" is set to the "priority indication flag", is on a higher level on the list (step S35).

The content list generation unit 32, assigns a candidate order (n=1, 2, 3, to each of the contents sorted at step S35 in the sorted order (step S36).

The content list generation unit 32, reads out the content, for which the judging process at step S35, explained later, has not been performed, and which has not been registered to the content list, and has the lowest candidate order (step S37).

Next, the content list generation unit 32, calculate a sum of the display time of the content, which was read out at step S37 and has the lowest candidate order, and a total of the display time of the contents in the content list, if the contents are registered in the content list (step S38).

Next, the content list generation unit 32 determines whether the sum of the display time, which is a sum of the display time, is less than or equal to the required time for printing received from the MFP 20 (step S40).

In the case that the sum of the display time is less than or equal to the required time for printing received from the MFP 20 (step S39 YES), the content read out at step S37 is set to be included in the content list (step S40).

Furthermore, after setting the content into the content list, as above, the content list generation unit 32 further determines whether a difference between the required time for printing and the sum of the display time is less than or equal to a predetermined time (e.g. five seconds) or not (step S41). In the case that the difference between the required time for printing and the sum of the display time is greater than the predetermined time (step S41 NO), the content list generation unit 32 does not determine the content list, and performs the process of step S37. On the other hand, in the case that the difference between the required time for printing and the sum of the display time (the signal display time) is less than or equal to the predetermined time (step S41 YES), based on the contents registered in the content list, the content list generation unit 32 confirms the content list (step S42). When the content list is confirmed, the content list generation unit 32 configures the content list to fill the time of the difference, less than the predetermined time (e.g. five seconds), by, for example, successively repeating the display of content, a display time of which is one second.

Moreover, in the case that the sum of the display time is judged greater than the required time for printing received from the MFP 20 (step S39 NO), the content list generation unit 32 further determines whether the sorted contents include content, for which the judgment process of step S39 has not been performed and which has not been registered in the content list (step S43). If such an unregistered and unjudged content exists (step S43 YES), the process of step S37 is performed again. On the other hand, if the unregistered and unjudged content does not exist (step S43 NO), the content list is confirmed based on the contents registered in the content list (step S42).

According to the above procedure, the content management server 30, based on the user attribute and the required time for printing, a content list can be generated, which has an appropriate configuration of contents so that playing the contents is not interrupted before the end of the printing.

With reference to FIG. 7, the process of transmitting the generated content list will be explained as follows.

The content list transmission unit 33 transmits the content list generated by the content list generation unit 32 to the MFP 20, which has transmitted the content list acquisition request.

The content acquisition request reception unit 34 receives the content acquisition request including the content ID transmitted from the MFP 20, and requires the content transmission unit 35 to transmit content corresponding to the content ID.

The content transmission unit 35 reads out content, from the content data storage unit 38, corresponding to the content ID notified by the content acquisition request reception unit 34, and transmits the read out content to the MFP 20. The content data storage unit 38, by using the memory device 303, the auxiliary storage device 302 or the recording medium 301, stores the body of each of the contents stored in the content information storage unit 37. The body of the content stored in the content data storage unit 38 may be stored in an external server or the like, not just in the content management server 30.

[Authentication Server]

The authentication server 40 includes an authentication process unit 41 and an authentication information storage unit 42. The above units are realized by a process executing at the CPU 404 of the authentication server 40 according to the program 410, installed in the authentication server 40.

The authentication process unit 41, in response to an authentication request from the MFP 20, executes the authentication process using authentication information registered in the authentication information storage unit 42 for each of the users. The authentication information storage unit 42 is a database, which records authentication information for each user. The authentication information is user identification information. The authentication process unit 41 authenticates whether the user identification information included in the authentication request transmitted from the MFP 20 is included in the user identification information stored in the authentication information storage unit 42 or not. The authentication process unit 41 determines whether the authentication is successful when the user identification information included in the authentication request is included in the user identification information stored in the authentication information storage unit 42. On the other hand, the authentication process unit 42 judges that the authentication is unsuccessful when the user identification information is not included in the user identification information stored in the authentication information storage unit 42. The authentication process unit 41, transmits a response to the authentication process request including a result of authentication to the MFP 20.

[Operation Procedure]

Figure 15:
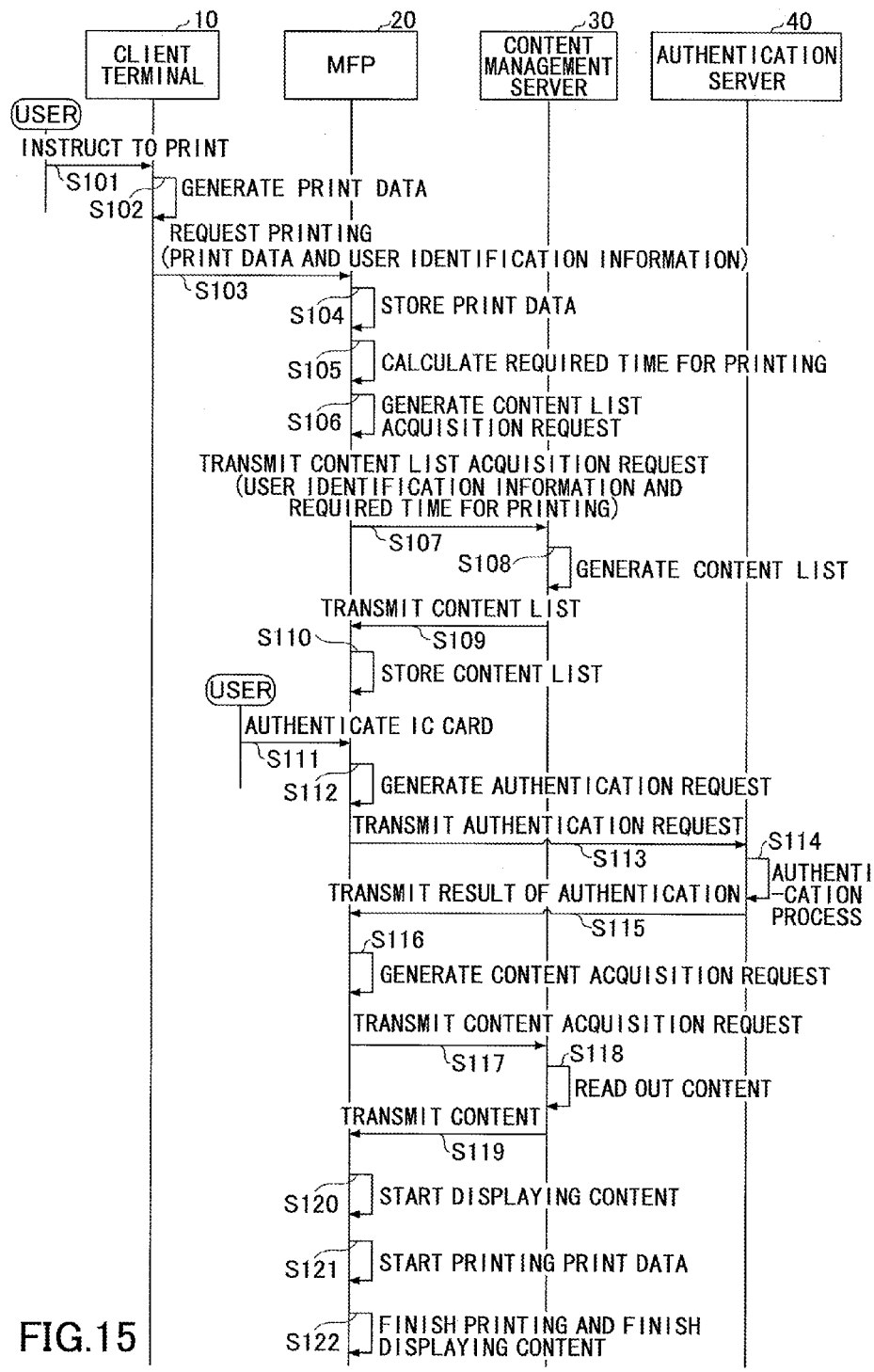
FIG. 15 is a sequence diagram illustrating an example of an operating process of the image forming system according to the exemplary embodiment.

Next, an operation procedure of the image forming system 1 according to the present exemplary embodiment for displaying content on the external display 260 of the MFP 20 during execution of printing in the MFP 20 will be explained in the following. FIG. 15 is a sequence diagram illustrating an example of the operation procedure of the image forming system 1 according to the exemplary embodiment. In FIG. 15, the user operates the client terminal 10.

The printing instruction reception unit 11 of the client terminal 10 receives an instruction to select an object to be printed from the user, displays a screen image for setting a print condition on a display unit of the client terminal 10, or the like. The printing instruction reception unit 11 accepts an input for the print condition via the screen image (step S101).

Next, the print data generation unit 12 generates, print data for document data, which is the object to be printed, based on the print condition (step S102). The print request unit 13 sets address information of the MFP 20 to a destination address, and sends a print request including the generated print data and the user identification information (step S103). Meanwhile, the user identification information was input when the user logged into the client terminal 10. Moreover, the address information, e.g. an IP address, of the MFP 20 is stored in advance in a storage unit of the client terminal 10.

The print request is received by the print request reception unit 281 of the MFP 20. The print request reception unit 281 stores print data in the print data storage unit 291 (step S104). Moreover, the print request reception unit 281 notifies the print time calculation unit 282 of the print data and the user identification information, which are extracted from the print data. The print time calculation unit 282 calculates a required time for printing based on the print condition and the user identification information extracted from the print data included in the print request, and based on a process time, corresponding to the print condition, stored in the process time storage unit 292 (step S105).

The content list acquisition request unit 283 generates a content list acquisition request including the user identification information and the calculated required time for printing (step S106). Next, the content list acquisition request unit 283 transmits to the content management server 30 the generated content list acquisition request (step S107).

The content list acquisition request is received by the content list acquisition request reception unit 31 of the content management server 30. The content list generation unit 32 generates a content list based on the user identification information and the required time for printing included in the content list acquisition request, and based on information stored in the user information storage unit 36 and content information storage unit 37 (step S108). Next, the content list transmission unit 33, transmits the generated content list to the MFP 20 (step S109). Meanwhile, on transmission of the content list, a body of the content may be transmitted. According to the above procedure, after success of authentication for the IC card, contents included in the content list can be displayed without querying the content management server from the MFP (procedures S116 to S119, explained later).

The content list reception unit 284 of the MFP 20 receives the content list, and stores the content list in the content list storage unit 293 (step S110).

Next, the user presses the IC card, carried by the user, onto the IC card reader 250, with which the MFP is equipped. The card information acquisition unit 285 of the MFP 20 acquires the user identification information stored in the IC card 50 (step S111). The authentication control unit 286 generates an authentication request including the user identification information acquired by the card information acquisition unit 285 (step S112). Next, the authentication control unit 286 transmits the generated authentication request to the authentication server 40, in which the authentication is performed (step S113).

The authentication process unit 41 of the authentication server 40 performs the authentication process based on the user identification information included in the received authentication request (step S114). Specifically, the authentication process unit 41 determines whether the user identification information included in the authentication request is included in the authentication information storage unit 42 or not. If the user identification information included in the authentication request is included in the authentication information storage unit 42, the authentication is successful. On the other hand, if the user identification information included in the authentication request is not included in the authentication information storage unit 42, the authentication is unsuccessful. The authentication process unit 41 sends a result of authentication to the MFP 20 (step S115).

The result of authentication is received by the authentication control unit 286. In the case that the result of authentication includes information indicating a success of the authentication, the authentication control unit 286 requires the content acquisition request unit 288 to acquire content included in the content list, and requires the print execution unit 287 to print the print data.

The content acquisition request unit 288 generates a content acquisition request to acquire the body of the content included in the content list (step S116). Specifically, the content acquisition request unit 288 reads out the content ID of the content included in the content list, which is stored in the content list storage unit 293. The content acquisition request unit 288 generates a content acquisition request including the read out content ID. The content acquisition request unit 288 sends the generated content acquisition request to the content management server 30 (step S117).

The content acquisition request reception unit 34 of the content management server 30 receives the content acquisition request, and requires the content transmission unit 35 to transmit the content. The content transmission unit 35 reads out the content corresponding to the content ID included in the content acquisition request from the content data storage unit 38 (step S118), and transmits the read out content to the MFP 20 (step S119). For the read out content the RTSP (Real Time Streaming Protocol) is employed, and the content is transmitted in a streaming format.

The content reception unit 289 of the MFP 20 receives the content included in the content list, and instructs the content display control unit 290 to display the content. The content display control unit 290 generates a content display screen image, as shown in FIG. 11, displays the content display screen image on the external display 260, and plays the content included in the content list in the content display screen image in a streaming format (step S120).

Moreover, at the same time as the start of playing of the content in the content display screen image, the print execution unit 287 starts printing the print data stored in the print data storage unit 291 (step S121). The process of playing the content by the content display control unit 290 (step S120) and the process of printing the print data by the print execution unit 287 (step S121) are synchronized, so that both processes start simultaneously.

Furthermore, the process of printing by the print execution unit 287 and the process of displaying (playing) the content by the content display control unit 290 end simultaneously (step S122). This is because contents to be displayed are configured in the content list based on the required time for printing, which was calculated in advance.

In the case of executing successive print jobs, a sum of the print time for executing the successive print jobs is calculated, and a content list based on the sum of the print time is generated.

Executing the process of generating the content list according to the present exemplary embodiment (FIG. 15, step S106) is not limited after receiving the print request by the MFP 20 (step S103). The process of generating the content list may be executed after receiving the result of authentication by the MFP 20 (step S115).

The image forming system 1 according to the present exemplary embodiment, explained above, generates a content list to be displayed on the external display 260 of the MFP, 20 during printing of the print data, based on the required time for printing calculated in advance based on the user attribute. By displaying the content based on the generated content list, an uninterrupted content, adjusted to end with the print process, can be provided.

Accordingly, a user can view content, which is selected based on a detailed condition reflecting the preference and objects of interest of the user based on the user attribute. Moreover, since the content is not interrupted during viewing of the content, the user does not feel dissatisfied with not finishing viewing of the content. Furthermore, the content provider can effectively provide content to a user, from whom the content provider can obtain a satisfactory effect for the advertisement, since the user views the content to the end.

The image forming system 1 according to the present exemplary embodiment is not limited to the print process, but may be applied to a copying process or a scanning process, which requires a predetermined wait time during the length of the process.

Further, the present invention is not limited to these embodiments, but various variations and modifications may be made without departing from the scope of the present invention.

Moreover, the display unit and the display screen generation unit recited in claims correspond to the content display control unit 290 in the present exemplary embodiment.

The present application is based on Japanese priority application No. 2013-006260 filed on Jan. 17, 2013, with the Japanese Patent Office, the entire contents of which are hereby incorporated by reference.

What is claimed is:

1. An image forming apparatus, which is configured to executes printing according to a print request based on an instruction by a user of a client terminal, comprising:
    a content information storage unit configured to store user identification information, the user identification information associated with a user and including information regarding content items that have been previously displayed to the user;
    a print time calculation unit configured to calculate a required time for printing according to the print request;
    a display screen generation unit configured to generate a content display screen image in which the plurality of content items are displayed in accordance with the content list,
        the content display screen image includes a region where the plurality of content items are displayed, a region where the content list is displayed, a region where the print request status is displayed, and a user interface element configured to control whether the content display screen image is displayed and
    a display unit configured to display a plurality of content items on a display device during an execution of printing in accordance with a content list including the plurality of content items for the user,
        the content list being generated based on a combination of content items of the plurality of content items that are selected according to,
            display times of the each item of the selected content items such that the selected content items are displayed to completion within the calculated required time for printing, and
            prohibiting the display of content items that have been previously displayed to the user according to the user identification information.

2. The image forming apparatus, as claimed in claim 1, wherein the content list is generated based on the required time for printing and on a user attribute of the user.

3. The image forming apparatus, as claimed in claim 1, wherein a display order of the plurality of content items on the display device is defined by the content list.

4. The image forming apparatus, as claimed in claim 1, wherein the content list is generated so that content items of the plurality of content items including information indicating that the content is to be preferentially displayed is given priority selection.

5. The image forming apparatus, as claimed in claim 1, further comprising:
    a process time storage unit configured to store a process time for a process corresponding to a print condition, and
    the print time calculation unit is configured to calculate the required time for printing based on the print condition, included in the print request, for an object to be printed, and based on the process time stored in the process time storage unit.

6. An image forming system comprising:
    an image forming apparatus configured to execute printing according to a print request based on an instruction by a user of a client terminal;
    a display device configured to display a plurality of content items for the user; and
    a content management server configured to manage the plurality of content items, wherein the image forming apparatus includes,
        a print time calculation unit configured to calculate a required time for printing according to the print request;
        a content list acquisition unit configured to transmit a content list acquisition request, including the required time for printing, to the content management server in order to acquire a content list including the plurality of content items, which are displayed on the display device;
        a display screen generation unit configured to generate a content display screen image in which the plurality of content items are displayed in accordance with the content list,
            the content display screen image includes a region where the plurality of content items are displayed, a region where the content list is displayed, a region where the print request status is displayed, and a user interface element configured to control whether the content display screen image is displayed; and
        a display unit configured to display the plurality of content items on the display device during an execution of printing in accordance with the content list, and
    the content management server includes,
        a user information storage unit configured to store the user identification information and a user attribute, associating the user identification information with the user attribute, and
        a content information storage unit configured to store the plurality of content and the user attribute of the user, for whom the plurality of content are displayed, associating the plurality of content with the user attribute,
        a content storage unit configured to store the plurality of content items in association with a display time of each content item of the plurality of content items, and
        a content list generation unit configured to,
            select, from the content storage unit and the content information storage unit, a combination of content items of the plurality of content items that can be displayed within the required time for printing included in the content list acquisition request, and has not been previously displayed to the user based on the user attribute corresponding to the user identification information, and
            generate the content list based on the selected content items.

7. The image forming system, as claimed in claim 6, wherein
    the content list acquisition request transmitted from the content list acquisition unit includes user identification information that identifies the user.

8. A display control method for displaying on a display device a plurality of content items for a user of a client terminal during an execution of printing at an image forming apparatus according to a print request based on an instruction by the user, the method comprising:
    calculating a required time for printing according to the print request;
    generating a content list including the plurality of content items, which are displayed on the display device based on the calculated required time for printing and according to the user identification information, the generating the content list including selecting a combination of content items of the plurality of content items according to, display times of the each content item of the selected content items, and prohibiting the display of content items that have been previously displayed to the user according to the user identification information;

generating a content display screen image in which the plurality of content items are displayed in accordance with the content list, the content display screen image includes a region where the plurality of content items are displayed, a region where the content list is displayed, a region where the print request status is displayed, and a user interface element configured to control whether the content display screen image is displayed; and displaying, in accordance with the content list, the plurality of content items on the display device during the execution of printing such that the selected content items are displayed within the calculated required time for printing.

9. The display control method, as claimed in claim 8, further comprising:

storing user identification information that identifies the user and a user attribute of the user, including associating the user identification information with the user attribute; and storing the plurality of content items and the user attribute of the user, to whom the plurality of content items are displayed, including associating the plurality of content items with the user attribute, wherein the content list is generated so as to include the content items selected based on the required time for printing and based on the user attribute corresponding to the user identification information.

\* \* \* \* \*